United States Patent
Wang et al.

(10) Patent No.: US 10,098,075 B2
(45) Date of Patent: Oct. 9, 2018

(54) APPARATUS AND METHOD FOR POWER CONTROL, REPORTING AND UPLINK TRANSMISSION

(71) Applicant: Samsung Electronics Co., Ltd., Gyeonggi-do (KR)

(72) Inventors: Yi Wang, Beijing (CN); Shichang Zhang, Beijing (CN); Yingyang Li, Beijing (CN); Chengjun Sun, Beijing (CN); Zheng Zhao, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/523,805

(22) PCT Filed: Nov. 3, 2015

(86) PCT No.: PCT/KR2015/011710
§ 371 (c)(1),
(2) Date: May 2, 2017

(87) PCT Pub. No.: WO2016/072704
PCT Pub. Date: May 12, 2016

(65) Prior Publication Data
US 2017/0339648 A1 Nov. 23, 2017

(30) Foreign Application Priority Data

Nov. 3, 2014 (CN) .......................... 2014 1 0609660
Nov. 25, 2014 (CN) .......................... 2014 1 0687281
(Continued)

(51) Int. Cl.
*H04W 16/14* (2009.01)
*H04W 52/36* (2009.01)
(Continued)

(52) U.S. Cl.
CPC ........... *H04W 52/36* (2013.01); *H04W 52/06* (2013.01); *H04W 52/08* (2013.01);
(Continued)

(58) Field of Classification Search
CPC ..... H04W 16/14; H04W 88/02; H04W 88/08; H04W 72/04; H04W 52/146;
(Continued)

(56) References Cited

U.S. PATENT DOCUMENTS 8,626,228 B1 * 1/2014 Pulugurta ............. H04W 52/50
455/41.2
2006/0227741 A1 10/2006 Lappetelainen
(Continued)

OTHER PUBLICATIONS

PCT/ISA/210 Search Report issued on PCT/KR2015/011710 (pp. 5).
(Continued)

*Primary Examiner* — Keith Ferguson
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a power adjusting method and corresponding to control node and UE. According to the present disclosure, interference to adjacent devices of the same or different wireless access techniques may be avoided, uplink scheduling efficiency of the UE may be
(Continued)

increased, and therefore the efficiency of the whole network is increased.

16 Claims, 9 Drawing Sheets

(30) Foreign Application Priority Data

Apr. 23, 2015 (CN) .......................... 2015 1 0199785
Sep. 16, 2015 (CN) .......................... 2015 1 0590377

(51) Int. Cl.
    *H04W 52/06*     (2009.01)
    *H04W 52/08*     (2009.01)
    *H04W 52/14*     (2009.01)
    *H04W 52/38*     (2009.01)
    *H04W 72/12*     (2009.01)
    *H04W 74/00*     (2009.01)

(52) U.S. Cl.
    CPC ....... *H04W 52/146* (2013.01); *H04W 52/367* (2013.01); *H04W 52/38* (2013.01); *H04W 72/1284* (2013.01); *H04W 52/365* (2013.01); *H04W 72/12* (2013.01); *H04W 74/00* (2013.01)

(58) Field of Classification Search
    CPC ........... H04W 72/1284; H04W 52/367; H04W 52/18; H04W 52/36; H04W 52/365
    USPC ..... 455/522, 69, 68, 509, 450, 508, 561, 73, 455/500, 517, 127.1–127.3, 414.1–414.4, 455/550.1, 572, 426.1, 426.2, 515, 507; 370/310, 329, 252, 338, 318, 328
See application file for complete search history.

(56) References Cited

U.S. PATENT DOCUMENTS

| | | | |
|---|---|---|---|
| 2007/0286122 A1* | 12/2007 | Fonseca | H04L 1/0021 370/329 |
| 2009/0196250 A1 | 8/2009 | Feng et al. | |
| 2010/0119000 A1 | 5/2010 | Kim et al. | |
| 2013/0017794 A1 | 1/2013 | Kloper et al. | |
| 2013/0195073 A1 | 8/2013 | Chen et al. | |
| 2013/0343288 A1 | 12/2013 | Ratasuk et al. | |
| 2014/0341018 A1* | 11/2014 | Bhushan | H04W 28/0289 370/230 |
| 2015/0092758 A1* | 4/2015 | Chen | H04W 16/14 370/336 |

OTHER PUBLICATIONS

PCT/ISA/237 Written Opinion issued on PCT/KR2015/011710 (pp. 9).
Rahman, M.I. et al., License-exempt LTE systems for secondary spectrum usage: Scenarios and first assessment, . . . 2011 IEEE Symposium on Dynamic Spectrum Access Networks (DySPAN), May 3-6, 2011, Copyright 2011 IEEE, pp. 11.
3rd Generation Partnership Project; Technical Specification Group Radio Access Network; Evolved Universal Terrestrial Radio Access (E-UTRA); Physical Layer Procedures (Release 12), 3GPP TS 36.213 V 12.3.0, Sep. 2014, 212 Pages.
Catt, "Required Functionalities for Licensed-Assisted Access Using LTE", R1-143751, 3GPP TSG RAN WG1 Meeting #78bis, Oct. 6-10, 2014, 4 pages.
European Search Report dated Sep. 6, 2017 issued in counterpart application No. 15857938.3-1875, 14 pages.

* cited by examiner

APPARATUS AND METHOD FOR POWER CONTROL, REPORTING AND UPLINK TRANSMISSION

PRIORITY

This application is a National Phase Entry of PCT International Application No. PCT/KR2015/011710, which was filed on Nov. 3, 2015, and claims priority to Chinese Patent Application Nos. 201410609660.X, 201410687281.2, 201510199785.4 and 201510590377.1, which were filed on Nov. 3, 2014, Nov. 25, 2014, Apr. 23, 2015 and Sep. 16, 2015, respectively, the contents of each of which are incorporated herein by reference.

BACKGROUND OF THE INVENTION

1. Field of the Invention

The present disclosure relates to mobile communication techniques, and more particularly, to a power control method, a power reporting method, an uplink transmission method, and corresponding UEs and control nodes.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Contradictions between the booming of the wireless service requirements of users and the limited spectrum resources become increasingly sharp. Mobile operators have started to consider taking the unlicensed band as a supplement for the licensed band. Therefore, researches about deploying LTE on the unlicensed band are put on agenda. The 3GPP has begun to study how to increase the spectrum utilization ratio of the whole network via the effective carrier aggregation on the unlicensed band and the licensed band in the premise that other techniques on the unlicensed band are not affected apparently. FIG. 1 is a schematic diagram illustrating a joint network scenario of the unlicensed band and the licensed band.

SUMMARY OF THE INVENTION

The unlicensed band has generally been assigned for other purposes, e.g., radar or 802.11 series Wireless Fidelity (Wifi). Thus, on the unlicensed band, the interference level is not fixed, which makes it hard to ensure the Quality of Service (QoS) of the LTE transmission. But the unlicensed band is still able to be used for transmitting data with low QoS requirement. Herein, the LTE system deployed on the unlicensed band is referred to as an LTE-U system. On the unlicensed band, it is a key problem that how to avoid interference between the LTE-U system and the other wireless system such as radar or Wifi. Clear Channel Assessment (CCA) is a collision avoidance mechanism generally adopted on the unlicensed band. One station (STA) has to detect the wireless channel before transmitting signals. The wireless channel can be occupied for transmitting signals only when it is detected that the channel is clear. The LTE-U also follows a similar mechanism, so as to ensure a low interference to other signals. In a relatively simple method, an LTE-U device (base station or user equipment) is dynamically on/off according to a CCA result, i.e., transmit signals when detecting the channel is clear, and not transmit signals when detecting the channel is occupied. However, considering that the LTE-U system may support flexible self-adaptive transmission, e.g., self-adaptive power control, the LTE-U device may avoid generating high interference to other signals through adjusting its transmit power. For example, when detecting that the channel is busy, the LTE-U device decreases its uplink transmit power. Through this manner, the transmission efficiency of the LTE-U system may be increased. It is urgent problem to be solved that how the LTE-U base station obtains relevant information to implement effective scheduling of the UE, and how the UE performs the uplink power control.

Embodiments of the present disclosure provide a power control method, a power reporting method, an uplink transmission method, and corresponding UEs and control nodes, so as to avoid interference to adjacent devices with the same or different wireless access techniques, increase uplink scheduling efficiency of the UE and thereby increasing efficiency of the whole network.

According to an embodiment of the present disclosure, a power control method includes:

receiving, by a UE, power control indication information from a control node, and obtaining a power control mode or a power control mechanism; and performing, by the UE, power control to an uplink transmission of the UE on an unlicensed band according to the power control mode or the power control mechanism.

In one embodiment, the power control mode includes any one of: a power control mode indicating to follow a power control mode indicated by the control node, and a UE self-adjusted power control mode.

In one embodiment, the power control mode indicated by the control node includes a unique set of predefined power control mechanism; or, the power control mode indicated by the control node includes one of at least two sets of power control mechanisms;

the UE self-adjusted power control mode includes one of at least two sets UE self-adjusted power control mechanisms; or, the UE self-adjusted power control mode includes determining whether to decrease a transmit power by the UE.

In one embodiment, the power control mechanism includes one of at least two sets of power control mechanisms.

The present disclosure also provides a power reporting method, including:

reporting, by a UE, uplink transmit power control relevant information of an unlicensed band;

wherein the uplink transmit power control relevant information is used for scheduling the UE on the unlicensed band.

In one embodiment, the uplink transmit power control relevant information includes any one of:

a difference between an actual transmit power of the UE or a UE-expected transmit power and a maximum transmit power;

a difference between an uplink transmit power of the UE scheduled by the control node and the UE-expected transmit power;

the UE-expected transmit power; and a difference between an uplink transmit power of the UE according to a predefined calculating method and a maximum transmit power;

wherein the UE-expected transmit power is an uplink transmit power determined by the UE according to energy level of other wireless access technique signals detected by the UE in order to reduce interference to the other devices.

In one embodiment, the uplink transmit power control relevant information is indicated by Power Headroom Report (PHR) Media Access Control Control Element (MAC CE).

In one embodiment, the UE reports at least two types of PHRs, one of the two types of PHRs is specified for the unlicensed band, and PHR configuration parameter and/or PHR trigger event of each type of PHR is configured independently;

the reporting by the UE the uplink transmit power control relevant information of the unlicensed band to the control node includes:

reporting, by the UE, the uplink transmit power control relevant information of the unlicensed band according to the PHR configuration parameter corresponding to the unlicensed band; or reporting, by the UE, the uplink transmit power control relevant information of the unlicensed band according to the PHR trigger event corresponding to the unlicensed band; or indicating, by the UE, the type of the PHR when reporting the PHR.

In one embodiment, the uplink transmit power control relevant information is a transmit power offset recommended by the UE; and the transmit power offset is the energy level of other wireless technique signals on the same carrier measured by the UE.

In one embodiment, the energy level of the other wireless technique signals on the same carrier includes: energy level of all other wireless technique signals on the same carrier, or, energy level of other wireless technique signals meeting a condition on the same carrier; wherein the energy level of the other wireless technique signals includes: signal energy, signal power, power spectrum or an equivalent form, or an offset of the energy level of the other wireless technique signals compared to a predefined threshold.

In one embodiment, the uplink transmit power control relevant information is a power control mode or a power control mechanism adopted by the UE.

In one embodiment, if the reporting is event-triggered, when the power control mode changes, the UE reports the uplink transmit power control relevant information.

In one embodiment, the uplink transmit power control relevant information includes any one of:

an actual transmit power of the UE;

whether the UE decreases the transmit power;

one of two sets of power control parameter and/or calculating method adopted by the UE.

In one embodiment, the UE transmits the uplink transmit power control relevant information of a carrier of the licensed band or a first available subframe meeting a condition on a carrier of the unlicensed band.

In one embodiment, the reporting of the uplink transmit power control relevant information is periodic or event-triggered.

In one embodiment, if accumulation is enabled, calculating, by the UE, a transmit power control adjustment state variable $f_c(i)$ for the transmission in subframe i for a serving cell c according to $f_c(i)=f_c(i-1)+\delta_c(i-K)$, wherein $\delta_c(i-K)$ denotes a TPC command received by the UE in subframe i-K, for following conditions 1 to 6, 1, the UE does not receive the corresponding TPC command in subframe $i-K_{PUSCH}$;

2, the UE is in a DRX state;

3, in the TDD system, subframe i is not an uplink subframe;

4, on the unlicensed carrier c, the UE does not transmit uplink signal in subframe i;

5, on the unlicensed carrier c, subframe i is not an uplink subframe;

6, on the unlicensed carrier c, the UE is not scheduled for uplink transmission in subframe i, if any one of the above conditions 1, 2, 3 and 4 is met, $\delta_c=0$; or if any one of the above conditions 1, 2, 3 and 5 is met, $\delta_c=0$; or if any one of the above conditions 1, 2, 3 and 6 is met, $\delta_c=0$; or if any one of the above conditions 1, 2, 3, 4 and 5 is met, $\delta_c=0$; or if any one of the above conditions 1, 2, 3, 4 and 6 is met, $\delta_c=0$; or if any one of the above conditions 1, 2, 3, 5 and 6 is met, $\delta_c=0$; or if any one of the above conditions 1, 2, 3, 4, 5 and 6 is met, $\delta_c=0$;

if accumulation is not enabled, calculating, by the UE, the transmit power control adjustment state variable $f_c(i)$ of the UE in subframe i for the serving cell c according to $f_c(i)=\delta_c(i-K)$, wherein $\delta_c(i-K)$ denotes the TPC command received by the UE in subframe i-K, for the above conditions 1 to 6, if any one of the above conditions 1, 2, 3 and 4 is met, $f_c(i)=f_c(i-1)$; or if any one of the above conditions 1, 2, 3 and 5 is met, $f_c(i)=f_c(i-1)$; or if any one of the above conditions 1, 2, 3 and 6 is met, $f_c(i)=f_c(i-1)$; or if any one of the above conditions 1, 2, 3, 4 and 5 is met, $f_c(j)=f_c(i-1)$; or if any one of the above conditions 1, 2, 3, 4 and 6 is met, $f_c(i)=f_c(i-1)$; or if any one of the above conditions 1, 2, 3, 5 and 6 is met, $f_c(i)=f_c(i-1)$; or if any one of the above conditions 1, 2, 3, 4, 5 and 6 is met, $f_c(i)=f_c(i-1)$;

the uplink transmit power control relevant information reported by the UE is a power headroom report (PHR), and the UE reports the PHR according to the calculated $f_c(i)$.

The present disclosure also provides an uplink transmission method, including:

determining, by a UE, a Carrier Clear Assessment (CCA) threshold according to a UE maximum transmit power;

measuring, by the UE, the energy level of the other signals on the same carrier of an unlicensed band; and determining, by the UE, an uplink transmission mode of the UE on the carrier according to whether the detected energy is higher than the CCA threshold.

In one embodiment, the determining by the UE the uplink transmission mode of the UE on the carrier according to whether the detected energy is higher than the CCA threshold includes: if the detected energy is higher than the CCA threshold, the UE not transmitting or deferring transmitting uplink signals; or adjusting the uplink transmit power and transmitting the uplink signals with the adjusted uplink transmit power; otherwise, transmitting, by the UE, uplink signals following scheduling of the control node.

In one embodiment, the method further includes:

receiving an uplink transmit power range configured by the control node for the uplink transmission of the UE on the unlicensed band;

the adjusting the uplink transmit power includes: adjusting, by the UE, the uplink transmit power on the carrier within the configured uplink transmit power range.

In one embodiment, the adjusting the uplink transmit power includes: adjusting the uplink transmit power to X1, wherein X1=min{X2, X3}, X2 denotes an uplink transmit power scheduled by the control node, X3 denotes an uplink transmit power determined by the UE according to the detected energy.

In one embodiment, the method further includes:

determining whether X1 is lower than a predefined minimum value of the uplink transmit power, if yes, not transmitting uplink signals; otherwise, transmitting uplink signals with power X1.

In one embodiment, the UE maximum transmit power is determined by UE maximum transmit power configuration information received from the control node, wherein the UE maximum transmit power configuration information includes one or more of the following:

a total configured maximum output power;
a configured maximum transmit power on a carrier;
a configured serving cell maximum transmit power;
a UE transmit power scheduled by the control node;
a configured maximum transmit power offset;
a configured maximum transmit power for determining the CCA threshold;

or, the UE maximum transmit power is determined according to a power class of the UE.

In one embodiment, the UE maximum transmit power configuration information further includes type indication information, used for indicating one of N kinds of methods for determining the UE maximum transmit power, wherein N is larger than or equal to 2.

The present disclosure also provides an uplink transmission method, including:

obtaining, by a UE, a CCA threshold, and determining, by the UE, a CCA threshold for uplink transmission according to the indicated CCA threshold;

measuring, by the UE, energy level of the carrier of an unlicensed band; and determining, by the UE, an uplink transmission mode of the UE on the carrier according to whether the detected energy is higher than the CCA threshold.

In one embodiment, the CCA threshold is configured by a control node, e.g., semi-statically configured by a base station.

In one embodiment, the semi-statically configured CCA threshold is indicated by RRC signaling or MAC signaling.

In one embodiment, the semi-statically configured CCA threshold $Z_1$ is not larger than $Y_2$; and/or, the semi-statically configured CCA threshold $Z_1$ is not larger than $Y_2+(Y_3-P_{CMAX})$, or, the semi-statically configured CCA threshold $Z_1$ is not larger than $Y_2+(Y_3-\text{Pcmax\_c})$, or, the semi-statically configured CCA threshold $Z_1$ is not larger than $Y_2+(Y_3-P$ power class).

In one embodiment, the determining the uplink transmission mode of the UE on the carrier according to whether the detected energy is higher than the CCA threshold includes: if the detected energy is higher than the CCA threshold, the UE not transmitting uplink signals, or deferring the transmission of the uplink signals, or adjusting the uplink transmit power and transmitting uplink signals with the adjusted uplink transmit power; otherwise, the UE transmitting the uplink signals following the scheduling of the control node.

In one embodiment, the CCA threshold for uplink transmission determined by the UE is the CCA threshold configured by the base station, or is a value lower than the CCA threshold configured by the base station, i.e., the CCA threshold configured by the base station is regarded as a maximum value of the CCA threshold can be used by the UE. The determination of the finally used CCA threshold is subject to the implementation of the UE and is determined by the UE according to regional policy.

The present disclosure further provides a control node, including: a power control indication module and a communication module, wherein, the power control indication module is adapted to generate power control indication information to indicate a power control mode or a power control mechanism, wherein the power control mode or the power control mechanism is used for performing power control to uplink transmission of a UE on an unlicensed band; and the communication module is adapted to transmit the power control indication information to the UE.

The present disclosure further provides a UE, including: a communication module and a power control module; wherein the communication module is adapted to receive power control indication information from a control node; and the power control module is adapted to obtain a power control mode or a power control mechanism from the power control indication information, and perform a power control to an uplink transmission of the UE on an unlicensed band according to the power control mode or the power control mechanism.

The present disclosure further provides a UE, including: a reporting module and a communication module, wherein the reporting module is adapted to report uplink transmit power control relevant information of the UE on an unlicensed band to the communication module; and the communication module is adapted to report the uplink transmit power control relevant information of the UE on the unlicensed band to a control node.

The present disclosure further provides a UE, including: a measuring module and a power control module; wherein the measuring module is adapted to measure energy level of interference signals on a same carrier of an unlicensed band; and the power control module is adapted to determine a Carrier Clear Assessment (CCA) threshold according to a UE maximum transmit power, and determine an uplink transmission mode of the UE on the carrier according to whether the detected energy is higher than the CCA threshold.

The present disclosure further provides a control node, including: a CCA threshold control module and a communication module; wherein the CCA threshold control indication module is adapted to generate CCA threshold indication information used for indicating a CCA threshold; and the communication module is adapted to transmit the CCA threshold indication information to the UE.

The present disclosure further provides a UE, including: a communication module and a power control module; wherein the communication module is adapted to receive CCA threshold indication information from a control node; and the power control module is adapted to obtain a CCA threshold from the CCA threshold indication information, and perform a power control to an uplink transmission of the UE on an unlicensed band according to the CCA threshold.

The present disclosure further provides a power control method, including:

receiving, by a UE, power control indication information from a control node, and obtaining a transmit power control (TPC) command; and performing, by the UE, power control adjustment to an uplink transmission of the UE on an unlicensed band according to the TPC command;

wherein if accumulation is enabled, calculating, by the UE, a transmit power control adjustment state variable $f_c(i)$ for the transmission in subframe i for a serving cell c according to $f_c(i)=f_c(i-1)+\delta_c(i-K)$, wherein $\delta_c(i-K)$ denotes the TPC command received by the UE in subframe i-K, for following conditions 1 to 6, 1, the UE does not receive the corresponding TPC command in subframe $i-K_{PUSCH}$;

2, the UE is in a DRX state;

3, in the TDD system, subframe i is not an uplink subframe;

4, on the unlicensed carrier c, the UE does not transmit uplink signal in subframe i;

5, on the unlicensed carrier c, subframe i is not an uplink subframe;

6, on the unlicensed carrier c, the UE is not scheduled for uplink transmission in subframe if any one of the above conditions 1, 2, 3 and 4 is met, $\delta_c=0$; or if any one of the above conditions 1, 2, 3 and 5 is met, $\delta_c=0$; or if any one of the above conditions 1, 2, 3 and 6 is met, $\delta_c=0$; or if any one of the above conditions 1, 2, 3, 4 and 5 is met, $\delta_c=0$; or if any one of the above conditions 1, 2, 3, 4 and 6 is met, $\delta_c=0$; or if any one of the above conditions 1, 2, 3, 5 and 6 is met, $\delta_c=0$; or if any one of the above conditions 1, 2, 3, 4, 5 and 6 is met, $\delta_c=0$;

if accumulation is not enabled, calculating, by the UE, the transmit power control adjustment state variable $f_c(i)$ of the UE in subframe i for the serving cell c according to $f_c(i)=\delta_c(i-K)$, wherein $\delta_c(i-K)$ denotes the TPC command received by the UE in subframe i-K, for the above conditions 1 to 6, if any one of the above conditions 1, 2, 3 and 4 is met, $f_c(i)=f_c(i-1)$; or if any one of the above conditions 1, 2, 3 and 5 is met, $f_c(i)=f_c(i-1)$; or if any one of the above conditions 1, 2, 3 and 6 is met, $f_c(i)=f_c(i-1)$; or if any one of the above conditions 1, 2, 3, 4 and 5 is met, $f_c(i)=f_c(i-1)$; or if any one of the above conditions 1, 2, 3, 4 and 6 is met, $f_c(i)=f_c(i-1)$; or if any one of the above conditions 1, 2, 3, 5 and 6 is met, $f_c(i)=f_c(i-1)$; or if any one of the above conditions 1, 2, 3, 4, 5 and 6 is met, $f_c(i)=f_c(i-1)$.

It can be seen that, on the unlicensed band, the present disclosure is able to avoid interference to adjacent devices based on the same or different wireless access techniques through adjusting the transmit power by the UE itself or by assigning appropriate transmit power to the UE by the control node with assistance of the UE, and increase the uplink scheduling efficiency of the UE, thereby increasing the efficiency of the whole network.

DETAILED DESCRIPTION OF EMBODIMENTS OF THE INVENTION

Figure 1:
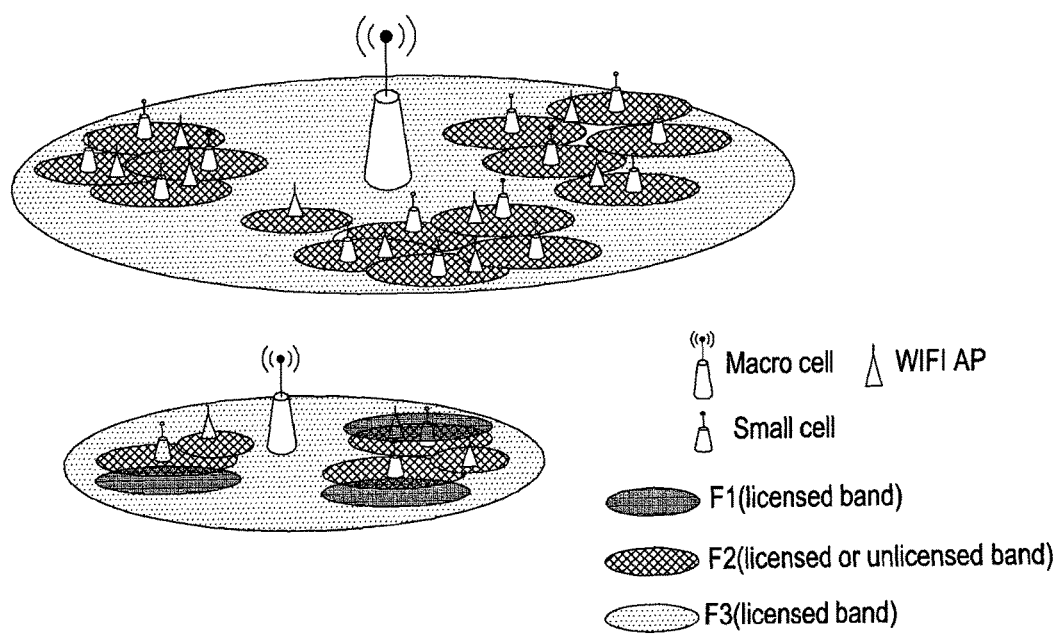
FIG. 1 is a schematic diagram illustrating a joint network scenario of the unlicensed band and the licensed band.

The present disclosure will be described in further detail hereinafter with reference to accompanying drawings and embodiments to make the objective, technical solution and merits therein clearer.

Embodiment 1

This embodiment provides a power control method. The method includes:

receiving, by a UE, power control indication information from a control node, and obtaining a power control mode or a power control mechanism; and performing, by the UE, power control to an uplink transmission of the UE on an unlicensed band according to the power control mode or the power control mechanism.

The control node may be a base station or a UE which performs a control function during communications. In this embodiment, the base station is taken as an exemplary control node.

Hereinafter, the power control indication information is described with respect to two different cases.

In a first case, the power control indication information may be the power control mode. The power control mode may be one of a plurality of power control modes. In one embodiment, there may be two modes, one of them indicates to follow the power control mode indicated by the control node, and the other is a UE self-adjusted power control mode, wherein:

The power control mode indicated by the control node may be a unique predefined power control mechanism, wherein the mechanism may be an existing power control mechanism or a newly-defined power control mechanism.

The power control mode indicated by the control node may also be one of a plurality of power control mechanisms. For example, two sets of power control parameter and/or calculating method may be defined, wherein one set of power control parameter and calculating method is the same as the existing power control mechanism, and the other set of power control parameter and/or calculating method is newly defined. The base station may indicate which set of the power control mechanisms is utilized via signaling. For example, the base station may indicate which set of the power control mechanisms is utilized via UL grant. The power control parameter is configured by the base station or defined in advance. The calculating method is defined in advance. The base station and the UE have the same knowledge about the power control parameter and the calculating method.

The UE self-adjusted power control mode may be: the UE independently determines to use one of a plurality of power control mechanisms. For example, two sets of power control parameter and/or calculating method may be defined, wherein one set of power control parameter and calculating method is the same as the existing power control mechanism, and the other set of power control parameter and/or calculating method is newly defined. The UE independently determines which set is to be used. The power control parameter is configured by the base station or defined in advance. The calculating method is defined in advance. The selection of the power control parameter and/or calculating method may be performed by the UE according to a predefined threshold, wherein the threshold is configured by the base station and advertised to the UE, and the base station and the UE have the same knowledge about the power control parameter and/or calculating method.

The UE self-adjusted power control mode may be: the UE independently determines whether to decrease the transmit power.

The power control indication information may be transmitted via downlink RRC signaling, downlink MAC signaling or physical layer signaling.

Figure 2:
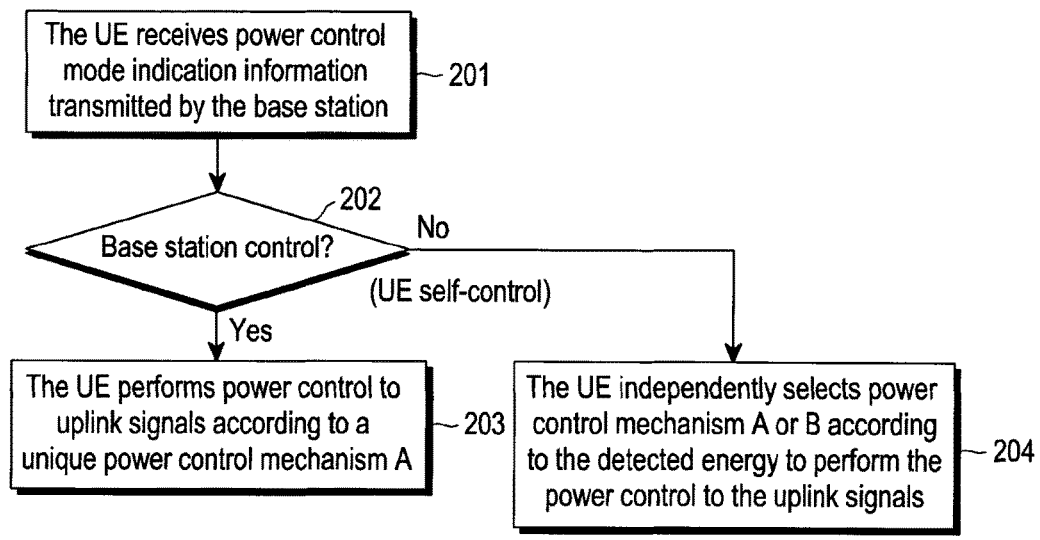
FIG. 2 is a flowchart illustrating a power control method according to an embodiment of the present disclosure.

If the power control indication information received by the UE is the power control mode indication information:

Referring to FIG. 2, if the power control mode indication information indicates to follow the power control mode indicated by the control node, and there is only one set of predefined power control mechanism A, the UE performs power control to the uplink transmission according to the predefined power control mechanism (as shown in 201~203). If the power control mode indication information indicates the UE self-adjusted power control mechanism, the UE independently selects the predefined power control mechanism A or power control mechanism B according to detected signal energy level of other devices to perform the power control to the uplink signals (as shown by 201, 202 and 204). In one embodiment, the UE may independently select the power control mechanism A or B according to a predefined threshold, wherein the power control mechanism B may be defined in advance, or is an undefined UE implementation method.

Figure 3:
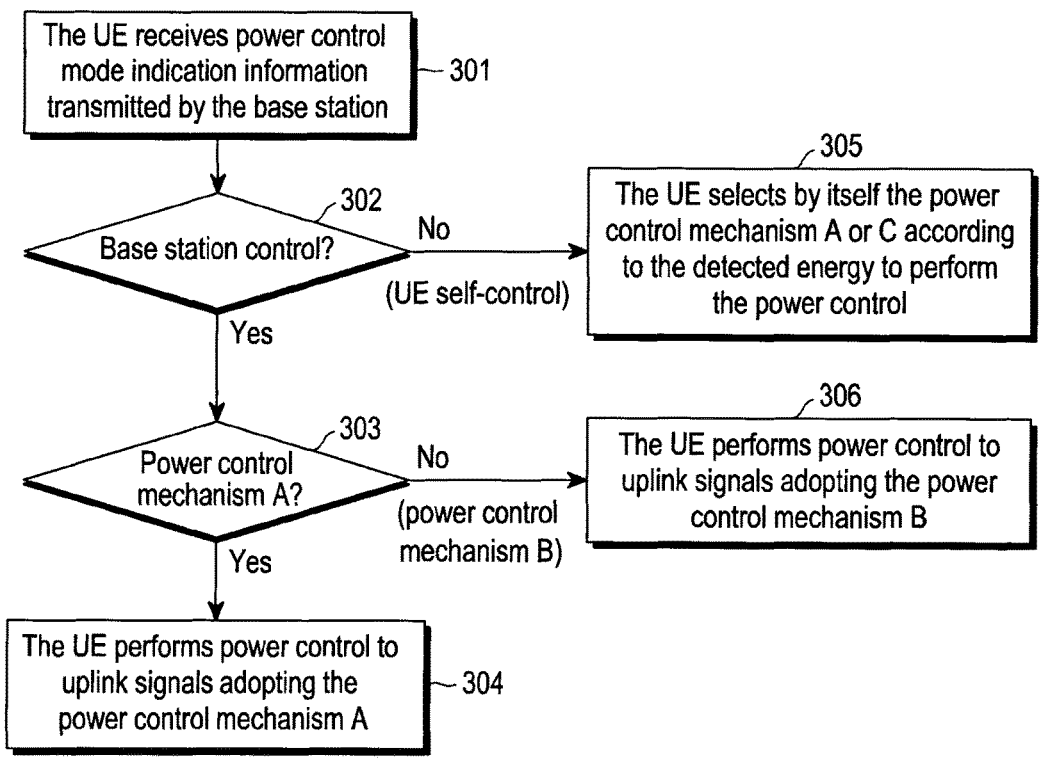
FIG. 3 is a flowchart illustrating a power control method according to another embodiment of the present disclosure.

Referring to FIG. 3, if the power control mode indication information indicates to follow the power control mode indicated by the base station, and there is a plurality of power control mechanisms, the UE performs the power control to the uplink according to the power control mechanism indicated in each UL grant transmitted by the base station. If the indicated power control mechanism is the power control mechanism A, the UE performs the power control to the uplink signals according to the power control mechanism A (as shown in 301~304). If the indicated power control mechanism is the power control mechanism B, the UE performs power control to the uplink signals according to the power control mechanism B (as shown in 301~303, 306). If the power control mode indication information indicates the UE self-adjusted mode, the UE independently selects the predefined power control mechanism A or the power control mechanism C according to detected signal energy level of other devices to perform the power control. In one embodiment, the UE may independently select the power control mechanism A or C according to a predefined threshold (as shown in 301, 302, and 305). The power control mechanism C may be the power control mechanism B or an undefined UE implementation method.

Figure 4:
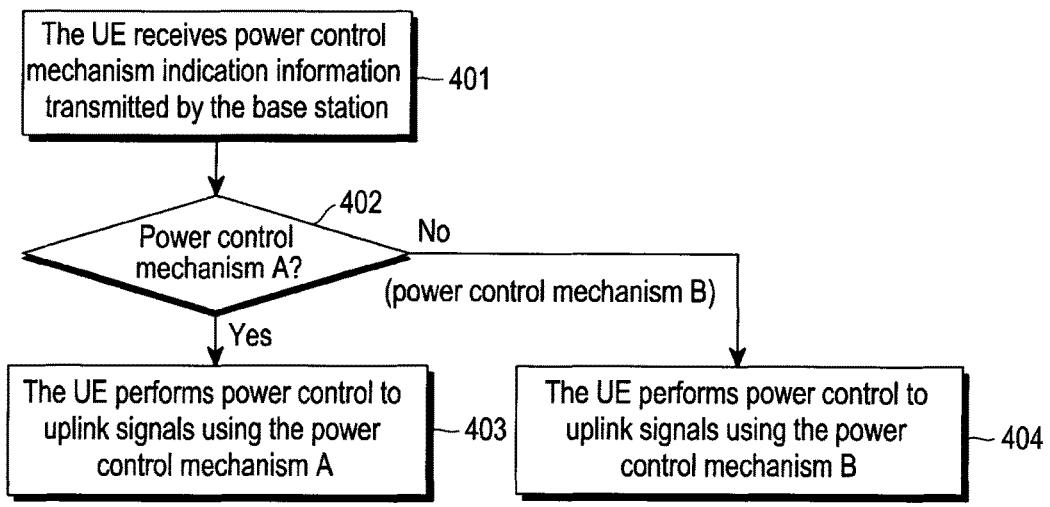
FIG. 4 is a flowchart illustrating a power control method according to still another embodiment of the present disclosure.

In a second case, the power control indication information may be the power control mechanism. In one embodiment, two sets of power control parameter and/or calculating method may be defined, wherein one set of power control parameter and calculating method is the same as an existing power control mechanism, and the other set of power control parameter and/or calculating method is newly defined. As shown in FIG. 4, the base station may indicate which set of the power control mechanisms is utilized via UL grant. The power control parameter is configured by the base station or defined in advance. The calculating method is defined in advance. The base station and the UE have the same knowledge about the power control parameter and the calculating method. It should be noted that, the difference between this method and the method in the former part of this embodiment relies in, this method does not configure the uplink power control mode by signaling, i.e., it is supposed that the uplink power control mode is defined advance and the power control mode indicated by the control node is followed, and there is no UE self-adjusted power control mode.

Embodiment 2

This embodiment provides a power reporting method. The method includes:

reporting, by a UE, uplink transmit power control relevant information of an unlicensed band to a control node; and scheduling, by the control node, the UE on the unlicensed band according to the uplink transmit power control relevant information reported by the UE. For example, the control node may assign transmit power, Modulation and Coding Scheme (MCS) and Physical Resource Block (PRB) for scheduling the UE on the unlicensed band next time based on the uplink transmit power control relevant information.

The control node may be a base station or a UE which performs a control function during communications. In this embodiment, the base station is taken as an exemplary control node.

Hereinafter, several cases of the uplink transmit power control relevant information are described.

In a first case, the uplink transmit power control relevant information may be as follows.

1) A difference between actual uplink transmit power of the UE or UE-expected transmit power and a maximum transmit power. The maximum transmit power Pcmax_c is defined similarly as Pcmax_c in section 5.1 of TS 36.213. If the UE decreases its transmit power by itself, the actual uplink transmit power is the decreased uplink transmit power. The UE-expected transmit power is an uplink transmit power determined by the UE according to detected energies of other devices in order to reduce interference to the other devices.

The uplink transmit power control relevant information may be indicated by a Media Access Control Control Element (MAC CE). In one embodiment, it may be indicated by Power Headroom Report (PHR) MAC CE. The uplink transmit power control relevant information may also be indicated by RRC signaling or physical layer signaling.

The base station may configure or predefine various kinds of PHRs for the UE, including an existing PHR and a newly-defined PHR. If both the existing PHR and the newly-defined PHR are reported, it is possible to report merely one Pcmax_c.

2) A difference between the UE uplink transmit power scheduled by the base station and the UE self-controlled expected transmit power Pcmax_a. The UE self-controlled expected transmit power may be a maximum uplink transmit power determined by the UE according to detected energies of other devices in order to reduce interference to the other devices.

The uplink transmit power control relevant information may be born by MAC CE. In one embodiment, it may be indicated by PHR MAC CE. The uplink transmit power relevant information may also be indicated by RRC signaling or physical layer signaling.

The base station may configure or predefine various kinds of PHRs for the UE, including an existing PHR and a newly-defined PHR. If both the existing PHR and the newly-defined PHR are reported, Pcmax_c and Pcmax_a are reported respectively.

3) The UE self-controlled expected transmit power Pcmax_a. The UE self-controlled expected transmit power may be the maximum uplink transmit power determined by the UE according to detected energies of other devices in order to reduce interference to the other devices.

The uplink transmit power control relevant information may be indicated by MAC CE. In one embodiment, it may be indicated by PHR MAC CE. The uplink transmit power relevant information may also be indicated by RRC signaling or physical layer signaling.

4) A difference between a UE uplink transmit power obtained according to a predefined calculating method and the maximum transmit power. The maximum transmit power Pcmax_c is defined similarly as Pcmax_c in section 5.1 of TS 36.213. The predefined calculating method may be a predefined calculating formula, a predefined parameter configuration, and the base station and the UE have the same knowledge about the predefined calculating method. For example, it may be defined that, the UE uplink transmit power includes merely parameters irrelevant to the scheduling information:

$$PH_{type1,c}(i) = \tilde{P}_{CMAX,c}(i) - \{P_{O\_PUSCH,c}(1) + \alpha_c(1) \cdot PL_c + f_c(i)\}$$

The uplink transmit power control relevant information may be born by MAC CE. In one embodiment, it may be indicated by PHR MAC CE. The uplink transmit power relevant information may also be indicated by RRC signaling or physical layer signaling.

The reporting of the uplink transmit power control relevant information may be periodic and/or event-triggered.

The uplink transmit power control relevant information may be transmitted on a carrier of the licensed band, or a first available uplink subframe meeting a condition on a carrier of the unlicensed band.

If the uplink transmit power control relevant information (i.e., power information) is indicated by the PHR MAC CE, the UE may report at least two types of PHR, wherein at least one type of PHR corresponds to the PHR report on the unlicensed band. For example, the PHR of the carrier of the licensed band may be reported similarly as in the prior art, and the PHR of the carrier of the unlicensed band is reported as the newly-defined PHR. At the same time, it is also possible to report the existing PHR and the newly-defined PHR on the same carrier.

The type of the PHR reported by the UE may be defined by the system. For example, merely the existing PHR is reported on the carrier of the licensed band, merely the newly-defined PHR is reported on the carrier of the unlicensed band or both existing PHR and the newly-defined PHR are reported on the carrier of the unlicensed band.

The type of the PHR reported by the UE may be configured by the base station.

The base station may independently configure the PHR configuration parameter and/or PHR trigger event for each type of PHR. The UE reports uplink transmit power control relevant information of the unlicensed band according to the PHR configuration parameter and/or PHR trigger event corresponding to the unlicensed band. For example, conventional PHR uses PHR configuration parameter 1, and the newly-defined PHR uses PHR configuration parameter 2. When reporting the conventional PHR, the UE reports according to the PHR configuration parameter 1, whereas when reporting the newly-defined PHR, the UE reports according to the PHR configuration parameter 2. In particular, It is possible to configure independent PHR configuration parameter for the power information, e.g., periodicPHR-Timer, prohit-Timer, dl-PathlossChange, etc.

It is possible to configure independent PHR trigger event for the power information. For example, the trigger event may be variation of signal energy level of other devices detected by the UE exceeds X dB, or the UE self-controlled expected transmit power exceeds X dB. The signal energy level of other devices detected by the UE may be signal energy, signal power, signal power spectrum or other equivalent forms. For example, when the UE reports PHR at time $n_1$, the detected energy level of other devices is $Y_1$ dBm/MHz. At time $n_2$, the detected signal energy level of other devices is $Y_2$ dBm/MHz. If $Y_2-Y_1>X$, it is regarded that the trigger condition is met, and the UE reports at the time $n_2$ or in a most recent available uplink subframe meeting the condition.

The UE self-controlled expected transmit power may be the maximum uplink transmit power determined by the UE according to the detected energy level of other devices in order to reduce interference to the other devices. For example, if the signal energy level of other devices detected by the UE is $Y_1$ dBm, the UE self-controlled expected transmit power is smaller than $Y_1$ dBm. For example, if the signal energy level of other devices detected by the UE is $Y_1$ dBm, the UE self-controlled expected transmit power is $Y_2+Y_3-Y_1$, wherein $Y_2$ and $Y_3$ are predefined parameters for implementing coexistence with other wireless access techniques on the unlicensed band. For example, $Y_2=-73$ dBm/MHz, $Y_3=23$. If the signal energy level of other devices detected by the UE is $Y_1=-70$ dBm/MHz, the UE self-controlled expected transmit power is 20 dBm.

The type of the PHR is indicated when the PHR is reported.

If the uplink transmit power control relevant information (i.e., power information) is indicated by other signaling, The base station may configure report periodicity and/or event trigger reporting parameter for the power information, e.g., periodicX-Timer, prohitX-Timer, dl-PathlossChange or ul-powerChange, etc.

A trigger event may be configured for the power information. For example, the trigger event may be variation of signal energy level of other devices detected by the UE exceeds X dB, or the UE self-controlled expected transmit power exceeds X dB. The signal energy level of other devices detected by the UE may be signal energy, signal power, signal power spectrum or other equivalent forms. The UE self-controlled expected transmit power may be the maximum uplink transmit power determined by the UE according to the detected energy of other devices in order to reduce interference to the other devices.

In a second situation, the uplink transmit power relevant information may be:

A transmit power offset recommended by the UE. The transmit power offset may be signal energy level of other wireless technique on the carrier measured by the UE, e.g., energy level of Wifi signals. If the UE is capable of differentiating different Wifi signals, the UE may respectively report the energy levels of different Wifi signals. The energy level of other wireless techniques may be signal energy, signal power, signal power spectrum or other equivalent forms, or an offset between the signal energy level of other wireless techniques and a predefined threshold. For example, it is possible to report the signal energy level of other wireless techniques $Y_1$ dBm/MHz, or $Y_1$ dBm, or $Y_1-Y_2$, wherein $Y_2$ is the predefined threshold, e.g., $-73$ dBm/MHz. The UE may report energy levels of all detected Wifi signals, or report energy levels of Wifi signals meeting a requirement according to a predefined rule, e.g., threshold, maximum number of Wifi signals to be reported.

If the threshold is an extremely small value, e.g., negative infinite, the reported information may indicate that whether Wifi signals are detected.

If the maximum number of Wifi signals to be reported is 1, the reported information may indicate the energy level of the Wifi signal having the highest interference level.

In one embodiment, the uplink transmit power control relevant information may be indicated by RRC signaling. The uplink transmit power control relevant information may also be indicated by MAC signaling or physical layer signaling.

The uplink transmit power control relevant information may be transmitted on the carrier of the licensed band, or transmitted in a first available uplink subframe meeting a condition on the carrier of the unlicensed band.

The reporting of the uplink transmit power control relevant information may be periodic or event-triggered.

In a third situation, the uplink transmit power control relevant information may be:

A probability that the UE decreases power to avoid interference to other wireless technique signals on the carrier and/or power decrease distribution. In one embodiment, the UE may report the probability of decreasing the transmit power or a Cumulated Distribution Function (CDF) of the transmit power decrease within observation time. It is possible to report a probability value or report on which time instances that the transmit power is decreased. For example, the observation time period is Xms, each Yms is taken as a minimum unit of the observation time. It is determined whether the power is decreased in each minimum unit of the observation time. The value 1 denotes that the power is decreased, and the value 0 denotes that the power is not decreased. The UE may generate a bit sequence of length [X/Y], wherein each bit corresponding to the situation of the power within one minimum unit of the observation time. In one example, the UE may also report a probability corresponding to each transmit power, e.g., quantify the decrease of the transmit power with predefined steps, and calculate a proportion of each decrease.

A scheduling time pattern recommended by the UE to the base station. In one example, the UE reports the recommended scheduling time pattern to indicate in which subframes the base station may schedule the uplink transmission of the UE with normal power, and in which subframes the base station needs to schedule the uplink transmission of the UE with lower power. In other words, the scheduling time pattern indicates the subframes in which the uplink transmission of the UE is scheduled with normal power and the subframes in which the uplink transmission of the UE is scheduled with decreased power. For example, if the observation time period is Xms, the UE may generate a bit sequence of length X, wherein each bit is denoted by value 0 or 1. If the base station is able to schedule the uplink transmission of the UE with normal power, the value of the bit is 1. If the base station needs to schedule the uplink transmission of the UE with lower power, the value of the bit is 0.

The reporting of the uplink transmit power control relevant information may be periodic and/or event-triggered. The base station may configure periodic report and/or event trigger report parameter for the information, e.g., periodicX-Timer, prohitX-Timer, ul-powerChange or interference-powerChange, etc. The base station may configure a trigger event for the power information. For example, the trigger event may be variation of signal energy level of other devices detected by the UE exceeds X dB, or variation of the UE-expected decreased transmit power exceeds X dB. The signal energy level of other devices detected by the UE may be signal energy, signal power, signal power spectrum or other equivalent forms. The UE-expected decreased transmit power may be the uplink transmit power to be decreased determined by the UE according to the detected energy of other devices in order to reduce interference to the other devices.

The uplink transmit power control relevant information may be transmitted on the carrier of the licensed band, or transmitted in a first available uplink subframe meeting a condition on the carrier of the unlicensed band.

In one embodiment, the uplink transmit power control relevant information may be indicated by RRC signaling. The uplink transmit power control relevant information may also be born by MAC signaling or physical layer signaling.

In a fourth case, the uplink transmit power control relevant information may be:

Power control mode or power control mechanism adopted by the UE. The power control mode may be one of a plurality of power control modes. In one embodiment, there are two modes. One is to follow the power control mode indicated by the control node. The other is a UE self-adjusted power control mode.

The reporting information may be event-triggered. For example, when the power control mode changes, the UE reports.

The uplink transmit power control relevant information may be transmitted on the carrier of the licensed band, or transmitted in a first available uplink subframe meeting a condition on the carrier of the unlicensed band.

In one embodiment, the uplink transmit power control relevant information may be indicated by RRC signaling. The uplink transmit power control relevant information may also be born by MAC signaling or physical layer signaling.

In a fifth case, the uplink transmit power control relevant information may be:

Actual transmit power of the UE. It may be a quantified offset between the actual transmit power and the UE uplink transmit power scheduled by the base station, i.e., a power decrease value, or may be quantified actual transmit power of the UE.

Whether the UE decreases the transmit power, i.e., whether the UE transmits according to the UE uplink transmit power scheduled by the base station or decreases the transmit power to reduce interference to other wireless technique devices.

One of a plurality sets of power control parameter and/or calculating method adopted by the UE. The plurality sets of power control and/or calculating method is configured by the base station in advance.

The uplink transmit power control relevant information may be uplink signal transmit power situation of PUSCH, SRS or PUCCH.

The reporting of the uplink transmit power control relevant information may be periodic or event-triggered.

The uplink transmit power control relevant information may be transmitted on the carrier of the licensed band, or transmitted in a first available uplink subframe meeting a condition on the carrier of the unlicensed band.

In one embodiment, the uplink transmit power control relevant information may be indicated by RRC signaling. The uplink transmit power control relevant information may also be indicated by MAC signaling or physical layer signaling.

If it is indicated by physical layer signaling, it may be carried by PUCCH or PUSCH, wherein the resource of the PUCCH may be configured by higher layer.

If it is indicated by physical layer signaling, it may be denoted by adopting different preambles, e.g., multiplying the demodulation reference signals by +1 or −1, or adopting different sequences.

Embodiment 3

This embodiment describes an uplink transmission method, including:

determining, by a UE, a CCA threshold according to a UE maximum transmit power, and detecting energy level of interference signals on the same carrier of the unlicensed band, determining an uplink transmission mode of the UE on the carrier according to whether the detected energy is higher than the CCA threshold.

The interference signals may be signals of devices using other wireless access techniques, e.g., Wifi signals, or may be signals of other devices using the same wireless access techniques, e.g., signals of an LTE-U device of the same operator or a different operator.

In one uplink transmission mode, if the detected energy is higher than the CCA threshold, the UE does not transmit uplink signals or defers the transmission of the uplink signals. If the detected energy is lower than or equal to the CCA threshold, the UE transmits uplink signals following the scheduling of the control node. This transmission manner is referred to as a Listen Before Talk (LBT) scheme.

In another uplink transmission mode, if the detected energy is higher than the CCA threshold, the UE adjusts the transmit power, and transmits uplink signals with the adjusted uplink transmit power. If the detected energy is lower than or equal to the CCA threshold, the UE transmits uplink signals following the scheduling the scheduling of the control node. When adjusting the uplink transmit power, there are following several solutions.

In a first solution, the control node may configure a minimum value and a maximum value for the uplink transmit power of the UE. Thus, when determining the uplink transmit power, the UE may determine whether to adjust its uplink transmit power within the configured range of the uplink transmit power. In particular, if the detected energy is higher than the CCA threshold, the UE adjusts the uplink transmit power on the carrier within the configured uplink transmit power range; otherwise, the UE transmits on the carrier according to the uplink transmit power scheduled by the control node.

Figure 5:
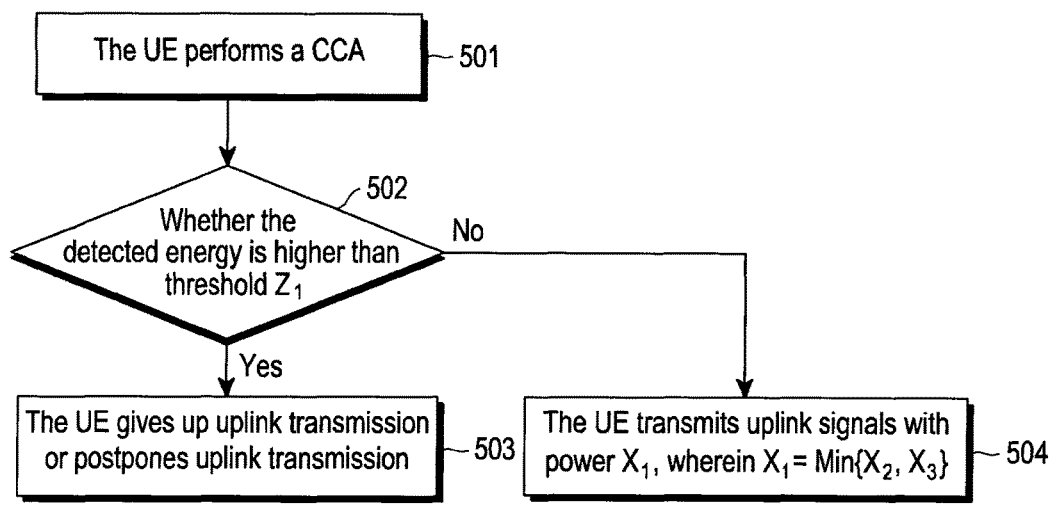
FIG. 5 is a flowchart illustrating a power adjusting method according to an embodiment of the present disclosure.

In a second solution, adjust the uplink transmit power and transmit with power $X_1$ (as shown in 501, 502, 504 in FIG. 5), wherein $X_1=\min\{X_2, X_3\}$, $X_2$ is the uplink transmit power scheduled by the control node, and $X_3$ is the uplink transmit power determined by the UE according to the detected signal energy level of other devices. For example, $X_3=Y_2+Y_3-Y_1$, wherein $Y_2$, $Y_3$ are predefined parameters for implementing coexistence of the UE with other wireless access technique devices on the unlicensed band. It should be noted that, if the uplink transmit power scheduled by the control node $X_2$ is smaller than $X_3$, it indicates that the UE does not adjust the uplink transmit power and the transmission is performed according to the uplink transmit power scheduled by the control node. Blocks 501, 502 and 503 in FIG. 5 show a situation in which the UE gives up or defers the uplink transmission if the detected energy $Y_1 > Z_1$, i.e., the above "first uplink transmission mode".

In a third solution, $X_1$ is calculated adopting the above second solution, and $X_1$ is compared with the predefined minimum value X of uplink transmit power, if $X_1 < X$, uplink signals are not transmitted; otherwise, uplink signals are transmitted with the power $X_1$.

Figure 12:
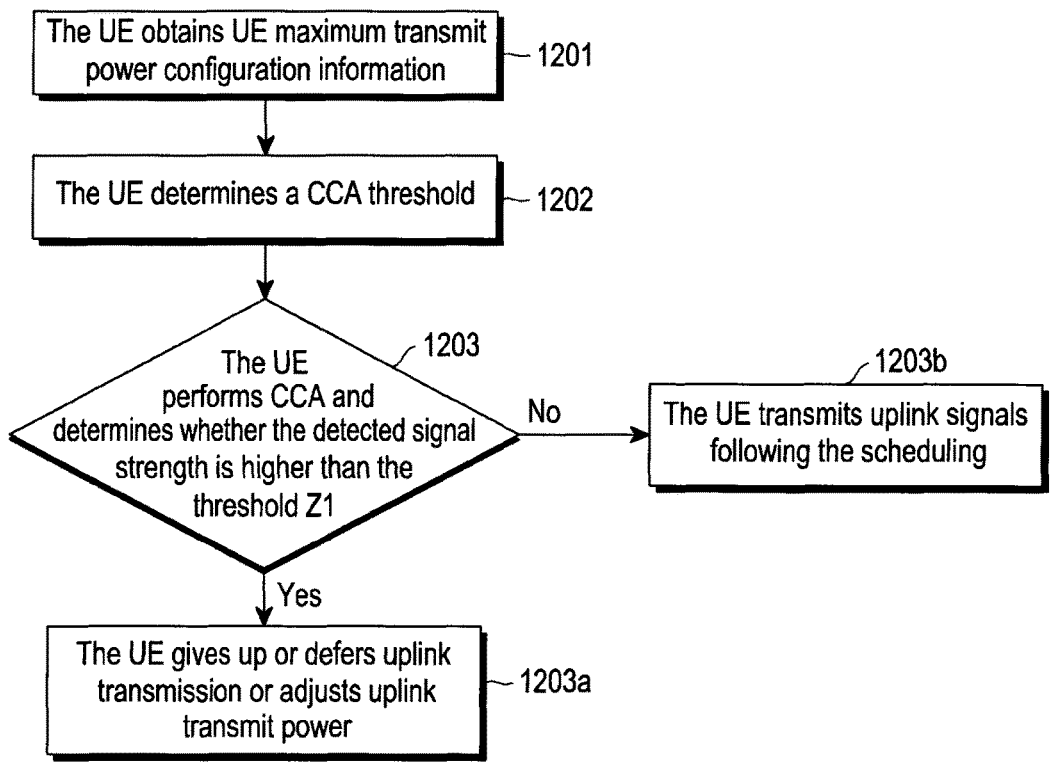
FIG. 12 is a flowchart illustrating an uplink transmitting method according to an embodiment of the present disclosure.

Hereinafter, the implementation of the embodiment of the present disclosure is described with reference to FIG. 12.

At block 1201, the UE obtains UE maximum transmit power configuration information.

The UE maximum transmit power configuration information may include: a maximum transmit power referred to by the UE operating on the unlicensed band and having Carrier Clear Assessment (CCA) capability when detecting the signal energy level of other devices on the unlicensed band.

In one embodiment, suppose that the UE maximum transmit power is denoted by Y, the value of Y may be determined according to the following method.

(1) The configured UE maximum transmit power may be PCMAX, i.e., the total configured maximum output power of the UE. When the UE transmits on merely one carrier, PCMAX is used for restricting the transmit power on this carrier. When the UE transmits on a plurality of carriers, the PCMAX is used for restricting the total transmit power of carriers with simultaneous transmission. For example, the base station configures M carriers for the UE, wherein N (N≤M) carriers are activated. At time $n_1$, the UE has uplink transmission on $L_1$ ($L_1 \leq N$) carriers simultaneously. At this time, the total transmit power of the UE on the $L_1$ carriers should be smaller than or equal to PCMAX.

(2) For the uplink transmission on carrier c, the configured UE maximum transmit power may be a maximum transmit power Pcmax_c, i.e., UE maximum transmit power on carrier c (or on a serving cell c).

(3) The configured UE maximum transmit power may be a serving cell maximum transmit power Pcmax_groupx, i.e., a maximum total transmit power of the UE on a group of carriers. It may be defined in advance that which carriers are included in the serving cell group. For example, carriers on the unlicensed band and those on the licensed band belong to different serving cell groups. Or, it may also be configured by the control node, e.g., configured by the base station via explicit or implicit higher layer signaling.

In one implementation, all carriers on the licensed band may be put into one group $g_1$, and all carriers on the unlicensed band may be put into a group $g_2$. The total transmit power of the UE on these two serving cell groups are respectively Pcmax_groupx1 and Pcmax_groupx2.

In another implementation, carriers on the unlicensed band may be further divided into a plurality of groups. For example, carrier 1 and carrier 2 are adjacent carriers and thus may be classified into group $g_1$. Carrier 3 is not adjacent to carrier 1 and carrier 2 and thus is put into group $g_2$ individually.

The present disclosure does not restrict that all carriers configured by the base station for the UE or all activated carriers must belong to the same group. It is possible to divide some carriers into groups, e.g., merely divide the carriers on the unlicensed band into one or more groups, respectively corresponding to one or more Pcmax_groupx.

(4) The configured UE maximum transmit power may be the uplink transmit power of the UE scheduled by the base station. For example, the uplink transmit power of the UE scheduled by the base station may be determined according to the formula in section 5.1 of TS 36.213.

(5) The configured UE maximum transmit power may be a power class of the UE. For example, the maximum transmit power may be determined according to the power class in section 6.2.2 in TS 36.101 or a newly-defined power class. In this situation, the UE may determine its power class by itself, so as to determine the UE maximum transmit power. The base station does not need to transmit additional signaling to explicitly configure the maximum transmit power. Except for this method, other methods including the aforementioned methods (1)~(4) and following methods (6) and (7), require the configuration of the control node.

(6) The configured UE maximum transmit power is a result obtained by the UE based on a CCA result according to a predefined rule. For example, the UE maximum transmit power Y may be determined by a function including the CCA result of the UE: $Y=Y_2+Y_3-Y_1 \cdot Y_2$ and $Y_3$ are pre-defined parameters for implementing coexistence with other wireless access technique devices on the unlicensed band. For example, $Y_2=-73$ dBm/MHz, $Y_3=23$, $Y_1$ is the detected signal energy level of other devices. For example, through the CCA on carrier C, it is obtained that $-Y_1=-70$ dBm/MHz. Thus, the maximum transmit power $Y=-73+23+70=20$ dBm.

(7) The configured UE maximum transmit power may be determined according to the UE maximum transmit power determined according to any one of the above methods (1)~(6) and an offset defined in advance or configured by the control node. Suppose that the UE maximum transmit power is Z, thus $Z=Y+O$. For example, the maximum transmit power Z may be determined according to the Pcmax_groupx in (3) and the configured offset, i.e., $Z=Pcmax\_groupx+O$.

(8) The configured UE maximum transmit power may be a maximum transmit power value configured by the base station merely for determining the CCA threshold.

In one embodiment, the UE maximum transmit power configuration information may be indicated by independent signaling, e.g. newly-defined signaling in above method (8); or indicated by other existing signaling, e.g., according to the above method (2), if the UE maximum transmit power is defined as the maximum transmit power Pcmax_c, the UE may determine the UE maximum transmit power when receiving information configuring the Pcmax_c, without additional signaling for configuring the maximum transmit power or indicating that the maximum transmit power is the maximum transmit power on a carrier. For another example, according to the above method (4), if the UE maximum transmit power is defined as the uplink transmit power of the UE scheduled by the base station, the UE may determine the maximum transmit power via receiving the uplink scheduling signaling, without additional signaling for configuring the maximum transmit power or indicating that the maximum transmit power is the uplink transmit power of the UE scheduled by the base station.

In one embodiment, the method for determining the UE maximum transmit power may be defined in advance or may be configurable. The configurable features include: the UE maximum transmit power configuration information may further include a type indicator, for indicating one of a plurality methods for determining the UE maximum transmit power. For example, two methods for determining the UE maximum transmit power are defined, e.g., the above methods (3) and (4). The type indicator may indicate that the UE maximum transmit power is determined based on method (3) or (4). The type indicator may be UE-specific, e.g., different UEs may be indicated to use different methods. For another example, some UEs may use a fixed predefined method for determining the maximum transmit power, whereas some other UEs may determine the method for determining the maximum transmit power according to the type indicator.

At block 1202, based on the maximum transmit power determined in block 1201, the UE calculates a CCA threshold according to a predefined rule.

The predefined rule may be a function which includes at least the UE maximum transmit power. For example, the CCA threshold $Z_1=Y_2+Y_3-Y \cdot Y_2=-73$ dBm/MHz, $Y_3=23$, $Y=20$ and is the UE maximum transmit power in method (3) of block 1201. Thus, the threshold $Z_1=-70$ dBm/MHz. For another example, $Z_1=Y_2+Y_3-(Y+O)$, wherein $Y_2=-82$ dBm/MHz, $Y_3=23$, $Y=23$ and is the maximum transmit power in method (1) of block 1201, $O=3$ dB and is the offset in method (7) of block 1201, thus the threshold $Z_1=-85$ dBm/MHz.

The UE may re-calculate the CCA threshold merely when the parameter for calculating the CCA threshold changes. For example, when the maximum transmit power determined in block 1201 is semi-statically indicated by higher layer signaling, the UE merely needs to re-calculate the CCA threshold when the higher layer semi-static indication changes. For example, if the maximum transmit power determined in method (7) of block 1201 is determined by the signal energy level of other devices obtained by each CCA, the UE needs to re-calculate the CCA threshold each time performing the CCA. For another example, if the maximum transmit power in method (5) of block 1201 is determined by the uplink transmit power of the UE scheduled by the base station each time, the UE needs to re-calculate the CCA threshold before each time of transmission.

At block 1203, the UE performs CCA on the same carrier of the unlicensed band, determines whether the energy level of the detected interference signals is higher than the CCA threshold determined in block 1202, and determines the uplink transmission mode of the UE on the carrier according to a determination result. As aforementioned, if the detected value (i.e., the energy level of the interference signals) is lower than or equal to the CCA threshold, i.e., $Y_1 \leq Z_1$, the UE transmits signals following the scheduling of the base station. If the detected value is higher than the CCA threshold, i.e., $Y_1 > Z_1$, the UE does not transmit signals or defers the transmission, or adjusts the uplink transmit power and transmits uplink signals with the adjusted uplink transmit power.

In one embodiment, if the detected value is higher than the CCA threshold, the UE does not transmit signals or defers the transmission, thus:

The UE may keep on performing the CCA, when the detected value is lower than or equal to the CCA threshold, the UE can transmit uplink signals. Or, The UE performs CCA after next time receiving the scheduling information transmitted by the control node. If the detected value is still higher than the CCA threshold, the UE still gives up the uplink transmission; if the detected value is lower than or equal to the CCA threshold, the UE transmits the uplink signal. Or, The UE may keep on performing the CCA within a predefined time window. If the detected value is lower than or equal to the CCA threshold, the UE transmits the uplink signals; otherwise, the UE gives up the uplink transmission. If the time window is over, the UE stops the CCA. Or, The UE may keep on performing the CCA within a predefined time window. If the detected value is lower than or equal to the CCA threshold, the UE transmits the uplink signals; otherwise, the UE gives up the uplink transmission. If the time window is over, the UE may directly transmit uplink signals without the CCA.

In one embodiment, if the detected value is higher than the CCA threshold, the UE adjusts the uplink transmit power. Then:

The UE adjusts the uplink transmit power within the range determined by the configured minimum value and maximum value of the uplink transmit power, i.e., adopts the aforementioned first solution. Or The UE adjusts the uplink transmit power $X_1=\min(Y_2+Y_3-Y_1, X_2)$, wherein $Y_2$ and $Y_3$ are predefined parameters for implementing coexistence with other wireless access technique devices on the unlicensed band, $Y_1$ denotes the energy level of the interference signals obtained by performing the CCA, $X_2$ denotes the uplink transmit power of the UE scheduled by the control node. The UE transmits uplink signals with the power $X_1$. This method is the aforementioned second solution, as shown in FIG. 5. Or, The UE calculates the uplink transmit power $X_1$ according to a predefined criteria, e.g., $X_1=\min(Y_2+Y_3-Y_1, X_2)$, and compares it with the predefined minimum value $X$ of the uplink transmit power. If $X_1 \le X$, the UE does not transmit signals, otherwise, the UE transmits uplink signals with power $X_1$. This method is the aforementioned third solution.

Figure 13:
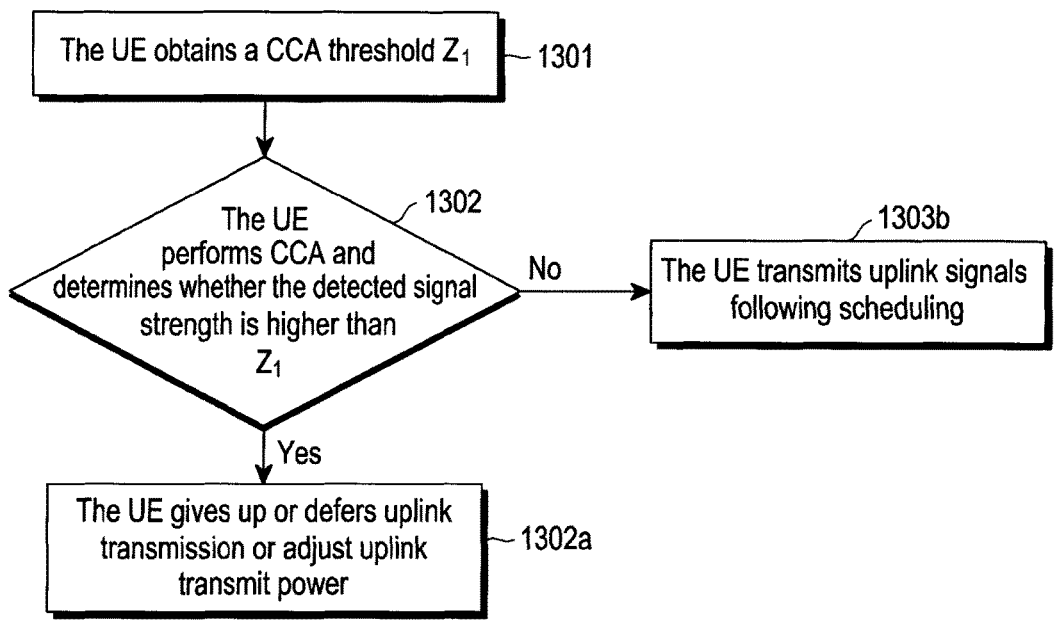
FIG. 13 is a flowchart illustrating an uplink transmitting method according to another embodiment of the present disclosure.

It should be noted that, the process of calculating the CCA threshold by the UE according to the configured maximum transmit power in block 1202 may be equivalent to configuring the CCA threshold to the UE by the base station, if the maximum transmit power configuration information obtained by the UE in block 1201 is a semi-statically configured value, e.g., if the maximum transmit power $Y$ is configured as the maximum transmit power used for determining the CCA threshold in (8) of block 1201, or configured as the total maximum output power (PCMAX) in (1), or configured as the maximum transmit power on a carrier (Pcmax_c) in (2), or configured as the serving cell group maximum transmit power in (3), or configured as the maximum transmit power offset in (7). In the calculation formula $Z_1=Y_2+Y_3-Y$ of the CCA threshold $Z_1$, $Y_2$ and $Y_3$ are fixed values, and only $Y$ is a variable configured by the base station semi-statically. Therefore, the process of configuring $Y$ for the UE by the base station is equivalent to configuring $Z_1$ for the UE. The base station may deduce corresponding CCA threshold and configure the CCA threshold for the UE according to an appropriate UE maximum uplink power, e.g., determine the UE maximum uplink power according to an interference level of the carrier. The base station may also directly determine the appropriate CCA threshold and directly configure the CCA threshold for the UE. The detailed implementation is subject to the implementation of the base station and is not restricted in the present disclosure. Based on the above analysis, another implementation of the present embodiment is as shown in FIG. 13, including the following.

At block 1301, the UE obtains a CCA threshold, wherein the CCA threshold is configured by the control node, e.g., semi-statically configured by the base station.

In one embodiment, the semi-statically configured CCA threshold may be indicated by RRC signaling, or MAC signaling.

In one embodiment, the semi-statically configured CCA threshold $Z_1$ is not larger than $Y_2$; and/or, the semi-statically configured CCA threshold $Z_1$ is not larger than $Y_2+(Y_3-$PCMAX$)$, or, the semi-statically configured CCA threshold $Z_1$ is not larger than $Y_2+(Y_3-$Pcmax_c$)$, or, the semi-statically configured CCA threshold $Z_1$ is not larger than $Y_2+(Y_3-P$ power class$)$.

At block 1302, the UE performs CCA on the same carrier of the unlicensed band, determines whether the energy level of the detected interference signals is higher than the CCA threshold determined in block 1301, and determines the uplink transmission mode of the UE on the carrier according to the determination result. As aforementioned, if the detected value (i.e., the energy level of the interference signals) is lower than or equal to the CCA threshold, e.g., $Y_1 \le Z_1$, the UE transmit signals following the scheduling of the base station; if the detected value is higher than the CCA threshold, i.e., $Y_1 > Z_1$, the UE does not transmit signals or defers signal transmission, or adjusts the uplink transmit power and transmits uplink signals with the adjusted uplink transmit power.

In this block, the UE may select a value which is lower than the CCA threshold determined in block 1301 as the CCA threshold, i.e., it is regarded that the CCA threshold determined in block 1301 is a maximum value of the CCA threshold can be used by the UE. The determination of the CCA threshold utilized by the UE is subject to the implementation of the UE. The UE may determine according to regional policy.

Embodiment 4

This embodiment provides a power control method. The method includes:

receiving, by a UE, power control indication information from a control node, and obtaining a transmit power control (TPC) command; and adjusting, by the UE, the transmit power for the transmission of the UE on the unlicensed band according to the TPC command.

The control node may be a base station or a UE which performs a control function during communications. In this embodiment, the base station is taken as an exemplary control node.

In a first case, if the UE is configured to operate in an accumulative power control mode, for example, if accumulation is enabled based on the parameter Accumulation-enabled provided by higher layers or if the TPC command $\delta_{PUSCH,c}(i-K_{PUSCH})$ is included in a PDCCH/EPDCCH with DCI format 0 for serving cell c where the CRC is scrambled by the Temporary C-RNTI, the PUSCH power control adjustment state variable $f_c(i)$ in the transmit power for the transmission of the UE such as the transmit power $P_{PUSCH,c}(I)$ for PUSCH transmission in subframe i for the serving cell c may be defined by:

$$f_c(i)=f_c(i-1)+\delta_{PUSCH,c}(i-K_{PUSCH})$$

See the PUSCH power control formula in section 5.1.1.1 of 3GPP TS 36.213 for reference.

$\delta_{PUSCH,c}(i-K_{PUSCH})$ denotes the TPC command received by the UE in subframe $i-K_{PUSCH}$. The TPC command may be included in the DCI scheduling the uplink transmission of subframe i, e.g., DCI format 0/4, or included in the DCI dedicated for indicating power adjustment, e.g., DCI format 3/3A. For the following conditions:

(1) the UE does not receive the corresponding TPC command in subframe $i-K_{PUSCH}$;

(2) the UE is in the DRX state;

(3) in the TDD system, subframe i is not an uplink subframe;

(4) on the unlicensed carrier c, the UE does not transmit uplink signal in subframe i;

(5) on the unlicensed carrier c, subframe i is not an uplink subframe;

(6) on the unlicensed carrier c, the UE is not scheduled for uplink transmission in subframe i.

If any one of the above conditions (1), (2), (3) and (4) is met, $\delta_{PUSCH,c}=0$; or if any one of the above conditions (1), (2), (3) and (5) is met, $\delta_{PUSCH,c}=0$; or if any one of the above conditions (1), (2), (3) and (6) is met, $\delta_{PUSCH,c}=0$; or if any one of the above conditions (1), (2), (3), (4) and (5) is met, $\delta_{PUSCH,c}=0$; or if any one of the above conditions (1), (2), (3), (4) and (6) is met, $\delta_{PUSCH,c}=0$; or if any one of the above conditions (1), (2), (3), (5) and (6) is met, $\delta_{PUSCH,c}=0$; or if any one of the above conditions (1), (2), (3), (4), (5) and (6) is met, $\delta_{PUSCH,c}=0$.

In an LAA system, one familiar application scenario is as follows, on a carrier of the unlicensed band, transmission of semi-persistent service (SPS) is not supported, i.e., merely the transmission of the dynamic scheduled service based on UL grant is supported, e.g., the base station transmits UL grant with DCI format 0/4 or a new DCI format in subframe $i-K_{PUSCH}$ to schedule the uplink transmission of the UE in subframe i. At the same time, on the carrier of the unlicensed band, non-adaptive retransmission is not supported, i.e., the retransmission based on PHICH is not supported and merely the transmission of the dynamic scheduled service based on UL grant is supported. Thus, on the unlicensed band, the TPC command is merely born by the UL grant but is not born by conventional DCI format 3/3A which is dedicated for indicating power adjustment. In this case, if the UE does not detect the UL grant, the UE cannot obtain uplink scheduling information and also cannot obtain TPC information. Therefore, the UE will not perform uplink transmission in the corresponding subframe. In this case, according to the related art, the UE does not receive the TPC information, thus $\delta_{PUSCH,c}=0$.

In another case, the UE detects the UL grant and obtains the uplink scheduling information and TPC information. But the UE does not pass the CCA in the subframe in which the UE is scheduled and cannot perform uplink transmission. Thus, the UE will not perform uplink transmission in the corresponding subframe. In this case, according to the related art, the UE updates $f_c(i)$ according to the received $\delta_{PUSCH,c}$, i.e., $\delta_{PUSCH,c}\neq 0$. However, in this case, the UE does not transmit uplink signal. The update of the $f_c(i)$ is meaningless. On the contrary, it makes the base station and the UE have different understanding for the TPC. If the base station does not detect the uplink transmission, since the base station cannot determine whether the UE does not transmit uplink signal due to not receiving the UL grant or receiving the UL grant but not passing the CCA, the base station cannot determine whether the UE has received the TPC and has accumulated the power, which results in asynchronization of $f_c(i)$ calculated by the base station and the UE. For example, in subframes i−4, i−5, i−6 and i−7, the base station respectively transmits four UL grants for scheduling UE1 to transmit uplink signals in subframes i, i−1, i−2 and i−3, wherein the TPC command is +1, +2, +1, and +0 dB. UE1 fails to detect the UL grant in subframe i−5 and correctly detects the UL grants in subframes i−4, i−6 and i−7 but passes the CCA in merely the subframe i, i.e., the UE transmits uplink signal in merely subframe i. According to the related art, the UE updates the $f_c(i)$ according to the TPC of $\delta_{PUSCH,c}(i-4)$, $\delta_{PUSCH,c}(i-6)$ and $\delta_{PUSCH,c}(i-7)$, i.e., $f_c(i)=f_c(i-4)+1+1+0$. However, since the base station detects uplink signal in merely subframe i, the base station is merely able to determine that the UE receives the TPC of subframe i−4, but cannot determine whether the UE receives the TPC of other subframes. Therefore, the base station cannot determine whether A in $f_c(i)=f_c(i-4)+A$ adopted by the UE includes merely $\delta_{PUSCH,c}(i-4)$, or includes $\delta_{PUSCH,c}(i-4)+\delta_{PUSCH,c}(i-5)$, or includes $\delta_{PUSCH,c}(i-4)+\delta_{PUSCH,c}(i-6)$, or includes $\delta_{PUSCH,c}(i-4)+\delta_{PUSCH,c}(i-7)$, or includes $\delta_{PUSCH,c}(i-4)+\delta_{PUSCH,c}(i-5)+\delta_{PUSCH,c}(i-6)$, or includes $\delta_{PUSCH,c}(i-4)+\delta_{PUSCH,c}(i-5)+\delta_{PUSCH,c}(i-7)$, or includes $\delta_{PUSCH,c}(i-4)+\delta_{PUSCH,c}(i-6)$ $\delta_{PUSCH,c}(i-7)$, or includes $\delta_{PUSCH,c}(i-4)+\delta_{PUSCH,c}(i-5)+\delta_{PUSCH,c}(i-6)+\delta_{PUSCH,c}(i-7)$ There may be at most $2^n$ possibilities, wherein n denotes the number of subframes in which the UE is scheduled but uplink signal is not detected. Herein, n=3. According to the method of embodiment 4, when the UE updates the $f_c(i)$, merely the $\delta_{PUSCH,c}$ corresponding to the subframes in which uplink signal is transmitted is considered, i.e., $\delta_{PUSCH,c}=0$ for subframes in which uplink signal is not transmitted. Thus, in this example, the A in the $f_c(i)=f_c(i-4)+A$ includes merely $\delta_{PUSCH,c}(i-4)$, whereas $\delta_{PUSCH,c}(i-5)$, $\delta_{PUSCH,c}(i-6)$ and $\delta_{PUSCH,c}(i-7)$ are set to 0. Therefore, the base station can determine the value of A.

It should be noted that, the method of the above condition (4) in this embodiment may further include the following two situations:

(4.a) When the base station schedules the UE to transmit uplink signal in subframe i, the base station and/or the UE cannot predict whether the UE is able to transmit uplink signal in subframe i.

For example, on the unlicensed band, the number of idle CCA slots N need to be detected by the UE is determined by the UE. The base station cannot know the value of N and therefore cannot know in advance whether the UE can pass the CCA before subframe i. On the other hand, the UE may be able to predict whether it can transmit uplink signal in subframe i, e.g., the value of N generated by the UE after receiving the uplink scheduling signal is relatively large, the duration corresponding to the number of the idle CCA slots N need to be detected by the UE is longer than the duration in which the UE may perform CCA, e.g., the UE can perform CCA in merely a former OFDM symbol of the subframe in which the UE is scheduled, but the duration corresponding to N is longer than one OFDM symbol, thus both the UE and the base station can determine that the UE cannot perform uplink transmission in the subframe i in which the UE is scheduled. Certainly, if the value of N generated by the UE is relatively small, the UE cannot predict whether it can pass the CCA before subframe i.

(4.b) When the base station schedules the UE to transmit uplink signal in subframe i, the base station and/or the UE already know that the UE cannot transmit uplink signal in subframe i.

For example, on the unlicensed band, the number of idle CCA slots N need to be detected by the UE is determined by the base station and is signaled to the UE being scheduled, e.g., indicated in the UL grant scheduling the UE. If the duration corresponding to the number of the idle CCA slots N need to be detected by the UE is longer than the time in which the UE is able to perform the CCA, e.g., the UE is able to perform CCA in merely a former OFDM symbol in the subframe in which the UE is scheduled but the duration corresponding to N exceeds one OFDM symbol, both the UE and the base station can determine that the UE cannot perform uplink transmission in the subframe i in which the UE is scheduled.

In this embodiment, the situations of (4.a) and (4.b) may also not be differentiated, and for both of the two situations, the $f_c(i)$ is not updated according to $\delta_{PUSCH,c}(i-K_{PUSCH})$ if the UE does not transmit uplink signal in subframe i. In this embodiment, it is also possible to differentiate the situations of (4.a) and (4.b), e.g., in situation (4.a), if the UE does not transmit uplink signal in subframe the $f_c(i)$ is still updated according to $\delta_{PUSCH,c}(i-K_{PUSCH})$, whereas in situation (4.b), if the UE does not transmit uplink signal in subframe i, the $f_c(i)$ is not updated according to $\delta_{PUSCH,c}(i-K_{PUSCH})$.

In the LAA system, there is another application scenario that uplink-downlink subframe configuration of the unlicensed carrier can be dynamically changed at a subframe level. For example, the base station configures subframe i as an uplink subframe, and subsequently configures subframe i as a downlink subframe. In this case, if the UE is able to determine that subframe i is not an uplink subframe, let $\delta_{PUSCH,c}=0$ even if the UE receives the TPC indicating the value of $\delta_{PUSCH,c}(i-K_{PUSCH})$ in subframe $i-K_{PUSCH}$, which corresponds to the method of the above condition (5) of this embodiment, i.e., on the unlicensed carrier c, if subframe i is not an uplink subframe, $\delta_{PUSCH,c}=0$.

In the LAA system, there is also another application scenario that uplink-downlink subframe configuration of the unlicensed carrier can be dynamically changed at a subframe level. The base station may not transmit signaling to indicate whether subframe i is an uplink subframe, but the UE can determine whether subframe i is an uplink subframe merely according to whether the base station schedules the UE to transmit uplink signal in subframe i, i.e., if the base station schedules the UE to transmit uplink signal in subframe i, the UE may determine that subframe i is an uplink subframe, whereas if the base station does not schedule the UE to transmit uplink signal in subframe i, the UE cannot determine whether subframe i is an uplink subframe, e.g., the UE cannot determine whether the base station schedules other users in subframe i. In this case, according to the above method of condition (6) of this embodiment, on the unlicensed carrier c, if the UE is not scheduled to transmit uplink signal in subframe i, $\delta_{PUSCH,c}=0$.

In a second case, if the UE is not configured to operate in the accumulative power control mode, for example, if accumulation is not enabled for serving cell c based on the parameter Accumulation-enabled provided by higher layers, the PUSCH power control adjustment state variable $f_c(i)$ in the transmit power for the transmission of the UE such as the transmit power $P_{PUSCH,c}(i)$ for PUSCH transmission in subframe i for the serving cell c may be defined by:

$$f_c(i)=\delta_{PUSCH,c}(i-K_{PUSCH})$$

wherein $(\delta_{PUSCH,c}(i-K_{PUSCH}))$ denotes the TPC command received by the UE in subframe $i-K_{PUSCH}$. The TPC command may be included in the DCI scheduling the uplink transmission in subframe i, e.g., DCI format 0/4. For the following conditions:

(1) the UE does not receive the corresponding TPC command in subframe $i-K_{PUSCH}$;
(2) the UE is in the DRX state;
(3) in the TDD system, subframe i is not an uplink subframe;
(4) on the unlicensed carrier c, the UE does not transmit uplink signal in subframe i;
(5) on the unlicensed carrier c, subframe i is not an uplink subframe;
(6) on the unlicensed carrier c, the UE is not scheduled for uplink transmission in subframe i.

If any one of the above conditions (1), (2), (3) and (4) is met, $f_c(i)=f_c(i-1)$; or
if any one of the above conditions (1), (2), (3) and (5) is met, $f_c(i)=f_c(i-1)$; or
if any one of the above conditions (1), (2), (3) and (6) is met, $f_c(i)=f_c(i-1)$; or if any one of the above conditions (1), (2), (3), (4) and (5) is met, $f_c(i)=f_c(i-1)$; or
if any one of the above conditions (1), (2), (3), (4) and (6) is met, $f_c(i)=f_c(i-1)$; or
if any one of the above conditions (1), (2), (3), (5) and (6) is met, $f_c(i)=f_c(i-1)$; or
if any one of the above conditions (1), (2), (3), (4), (5) and (6) is met, $f_c(i)=f_c(i-1)$.

The above descriptions take the power control of the PUSCH as an example. The above method is also applicable for power control of other uplink signals, e.g., SRS or PUCCH transmitted on the carrier of the unlicensed band.

In the above power control method provided by this embodiment of the present disclosure, the UE may report PHR via the following two manners.

In one manner, when the UE reports the PHR, the utilized $f_c(i)$ is the same as that for determining the transmit power for the uplink transmission described in this embodiment.

In the other manner, when the UE reports the PHR, the utilized L (i) is the different from that for determining the transmit power for the uplink transmission described in this embodiment. For example, the $f_c(i)$ for reporting PHR is determined according to the above conditions (1)~(3). On the unlicensed band, if the base station schedules the UE to transmit uplink signal in subframe i, and the UE receives the TPC command in subframe $i-K_{PUSCH}$, but the UE does not pass the CCA and thus does not transmit uplink signal in subframe i, then the UE still updates the $f_c(i)$ in the assumed transmit power according to $\delta_{PUSCH,c}(i-K_{PUSCH})$ when calculating the PHR. However, the $f_c(i)$ in the uplink transmit power calculated when transmitting uplink signal is determined according to the above conditions (1)~(4), therefore $\delta_{PUSCH,c}(i-K_{PUSCH})=0$.

The power control method, power reporting method and uplink transmission method provided by the present disclosure are described with reference to four embodiments. In a practical application, the above methods may be used independently or used in combination.

Figure 6:
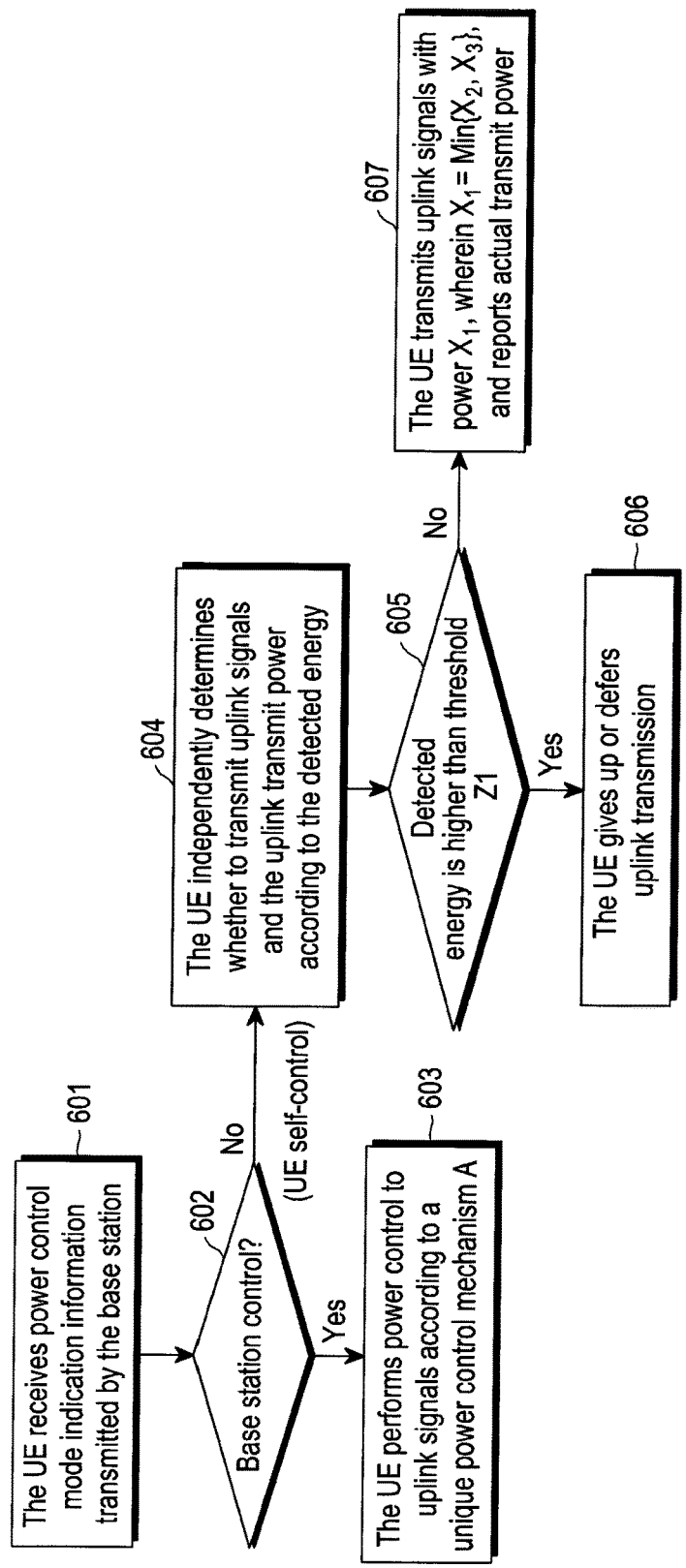
FIG. 6 is a flowchart illustrating a power control, adjusting and reporting method according to an embodiment of the present disclosure.

For example, based on the solution of embodiment 1, the base station transmits power control indication information to the UE, so as to indicate the power control mode or power control mechanism to the UE. If the power control indication information indicates the UE self-adjusted power control mode, the UE may determine, according to the solution of embodiment 3, whether to decrease transmit power or give up transmission or defer transmission according to the predefined threshold. Suppose that the predefined threshold is $Z_1$, if the signal energy level of other devices detected by the UE $Y_1 <= Z_1$, the UE adjusts the uplink transmit power and transmits with energy level $X_1$, wherein $X_1=\min\{X_2, X_3\}$, $X_2$ is the uplink transmit power scheduled by the base station, and $X_3$ is the uplink transmit power determined by the UE according to the signal energy level of other devices detected by the UE. For example, $X_3=Y_2+Y_3-Y_1$, wherein $Y_2$ and $Y_3$ are parameters for implementing coexistence with other wireless access technique devices on the unlicensed band. Further, the UE may report the actual transmit power to the base station according to the solution of embodiment 2, e.g., report $X_1$, or report $X_3-X_2$ (as shown in 601, 602, 604, 605 and 607 in FIG. 6).

It can be seen from the above technical solution that, the present disclosure is able to avoid interference to adjacent devices of the same or different wireless access techniques through independently adjusting the transmit power by the UE or through assigning appropriate transmit power to the UE by the base station with assistance of the UE, and increase uplink scheduling efficiency of the UE, so as to increase efficiency of the whole network.

Figure 7:
FIG. 7 is a schematic diagram illustrating a structure of a control node according to an embodiment of the present disclosure.

In accordance with the above method, the present disclosure further provides a control node, as shown in FIG. 7, the control node includes: a power control indication module and a communication module; wherein the power control indication module is adapted to generate power control indication information used for indicating a power control mode or a power control mechanism; wherein the power control mode or the power control mechanism is used for controlling an uplink transmit power of the UE on an unlicensed band; and the communication module is adapted to transmit the power control indication information to the UE.

Figure 8:
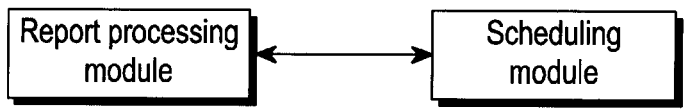
FIG. 8 is a schematic diagram illustrating a structure of a control node according to another embodiment of the present disclosure.

In accordance with the above method, the present disclosure further provides a control node as shown in FIG. 8, the control node includes: a report processing module and a scheduling module, wherein the report processing module is adapted to receive, from a UE, uplink transmit power control relevant information of an unlicensed band of the UE; and the scheduling module is adapted to schedule the UE on the unlicensed band according to the uplink transmit power control relevant information.

Figure 9:
FIG. 9 is a schematic diagram illustrating a structure of a UE according to an embodiment of the present disclosure.

In accordance with the above method, the present disclosure further provides a UE. As shown in FIG. 9, the UE includes: a communication module and a power control module, wherein the communication module is adapted to receive power control indication information from a control node; and the power control module is adapted to obtain a power control mode or a power control mechanism from the power control indication information, and perform a power control to an uplink transmission of the UE on the unlicensed band according to the power control mode or the power control mechanism.

Figure 10:
FIG. 10 is a schematic diagram illustrating a structure of a UE according to another embodiment of the present disclosure.

In accordance with the above method, the present disclosure further provides a UE as shown in FIG. 10. The UE includes: a reporting module and a communication module, wherein the reporting module is adapted to transmit uplink transmit power control relevant information of an unlicensed band of the UE to the communication module; and the communication module is adapted to report the uplink transmit power control relevant information of the unlicensed band of the UE to the control node.

Figure 11:
FIG. 11 is a schematic diagram illustrating a structure of a UE according to still another embodiment of the present disclosure.

In accordance with the above method, the present disclosure further provides a UE as shown in FIG. 11, the UE includes: a measuring module and a power control module; wherein the measuring module is adapted to measure energy level of other wireless access technique signals on the same carrier of the unlicensed band; and the power control module is adapted to determine an uplink transmit power of the UE on the carrier according to the energy level of the other wireless access technique signals.

Figure 14:
FIG. 14 is a schematic diagram illustrating a structure of a UE according to an embodiment of the present disclosure.

In accordance with the method of embodiment 4, the present disclosure further provides a UE as shown in FIG. 14. The UE includes: an indication receiving module and a power adjusting module, wherein the indication receiving module is adapted to receive power control indication information from a control node, and obtain a TPC command;

the power adjusting module is adapted to perform transmit power adjustment for the transmission of the UE on the unlicensed band according to the TPC command;

wherein if accumulation is enabled, the power adjusting module calculates the transmit power control adjustment state variable $f_c(i)$ for the transmission in subframe i for the serving cell c according to $f_c(i)=f_c(i-1)+\delta_c(i-K)$, wherein $\delta_c(i-K)$ denotes the TPC command received by the UE in subframe i−K, for the following conditions 1 to 6, 1. the UE does not receive the corresponding TPC command in subframe $i-K_{PUSCH}$;
2. the UE is in the DRX state;
3. in the TDD system, subframe i is not an uplink subframe;
4. on the unlicensed carrier c, the UE does not transmit uplink signal in subframe i;
5. on the unlicensed carrier c, subframe i is not an uplink subframe;
6. on the unlicensed carrier c, the UE is not scheduled for uplink transmission in subframe i.

If any one of the above conditions 1, 2, 3 and 4 is met, $\delta_c=0$; or if any one of the above conditions 1, 2, 3 and 5 is met, $\delta_c=0$; or if any one of the above conditions 1, 2, 3 and 6 is met, $\delta_c=0$; or if any one of the above conditions 1, 2, 3, 4 and 5 is met, $\delta_c=0$; or if any one of the above conditions 1, 2, 3, 4 and 6 is met, $\delta_c=0$; or if any one of the above conditions 1, 2, 3, 5 and 6 is met, $\delta_c=0$; or if any one of the above conditions 1, 2, 3, 4, 5 and 6 is met, $\delta_c=0$.

If accumulation is not enabled, the power adjusting module calculates the transmit power control adjustment state variable $f_c(i)$ of the UE in subframe i for the serving cell c according to $f_c(i)=\delta_c(i-K)$, wherein $\delta_c(i-K)$ denotes the TPC command received by the UE in subframe i−K, for the above conditions 1 to 6, If any one of the above conditions 1, 2, 3 and 4 is met, $f_c(i)=f_c(i-1)$; or if any one of the above conditions 1, 2, 3 and 5 is met, $f_c(i)=f_c(i-1)$; or if any one of the above conditions 1, 2, 3 and 6 is met, $f_c(i)=f_c(i-1)$; or if any one of the above conditions 1, 2, 3, 4 and 5 is met, $f_c(i)=f_c(i-1)$; or if any one of the above conditions 1, 2, 3, 4 and 6 is met, $f_c(i)=f_c(i-1)$; or if any one of the above conditions 1, 2, 3, 5 and 6 is met, $f_c(i)=f_c(i-1)$; or if any one of the above conditions 1, 2, 3, 4, 5 and 6 is met, $f_c(i)=f_c(i-1)$.

The foregoing descriptions are only preferred embodiments of this disclosure and are not for use in limiting the protection scope thereof. Any changes and modifications can be made by those skilled in the art without departing from the spirit of this disclosure and therefore should be covered within the protection scope as set by the appended claims.

What is claimed is:

1. A power control method, comprising:
   receiving from a base station, by a user equipment (UE), power control indication information;
   identifying a power control mode indicating that a mechanism for power control is selected by the base station or the UE, based on the power control indication information; and
   if the power control mode indicates that the mechanism for power control is selected by the base station, performing, by the UE, power control for an uplink transmission of the UE on an unlicensed band according to a first power control mechanism or a second power control mechanism selected by the base station; and if the power control mode indicates that the mechanism for power control is selected by the UE, performing, by the UE, power control for the uplink transmission of the UE on the unlicensed band according to the first power control mechanism or a third power control mechanism selected by the UE.

2. The method of claim 1, wherein if the mechanism for the power control is selected by the UE, the UE selects either the first power control mechanism or the third power control mechanism based on at least one of a signal energy, a signal power, or a signal power spectrum of other device using the unlicensed band, for reducing an interference caused by said other device.

3. A power reporting method, comprising:
configuring, by a user equipment (UE), uplink power control information
used for scheduling an uplink transmission of the UE on an unlicensed band; and
transmitting to a base station, by the UE, the uplink power control information,
wherein the uplink power control information includes at least one of:
a UE-expected transmit power being an expected uplink transmit power determined by the UE, according to an energy level of other wireless signals detected by the UE, for reducing an interference caused by the other devices,
power offset information indicating an energy level of the other wireless signals on the same carrier measured by the UE, or
information indicating whether the UE decreases an uplink transmit power.

4. The method of claim 3, wherein the uplink transmit power control information further includes at least any one of:
a difference between an actual transmit power of the UE or the UE-expected transmit power and a maximum transmit power;
a difference between an uplink transmit power of the UE scheduled by the base station and the UE-expected transmit power, or
a difference between an uplink transmit power of the UE according to a predefined calculating method and a maximum transmit power.

5. The method of claim 3, wherein the uplink power control information further includes at least any one of:
an actual transmit power of the UE, and
a power control parameter and a calculation method adopted by the UE.

6. The method of claim 3, wherein
if accumulation is enabled, calculating, by the UE, a transmit power control adjustment state variable $f_c(i)$ for the transmission in subframe i for a serving cell c according to $f_c(i)=f_c(i-1)+\delta_c(i-K)$, wherein $\delta_c(i-K)$ denotes a TPC command received by the UE in subframe i-K for following conditions 1 to 6,
1, the UE does not receive the corresponding TPC command in subframe $i-K_{PUSCH}$;
2, the UE is in a DRX state;
3, in the TDD system, subframe i is not an uplink subframe;
4, on the unlicensed carrier c, the UE does not transmit uplink signal in subframe i;
5, on the unlicensed carrier c, subframe i is not an uplink subframe;
6, on the unlicensed carrier c, the UE is not scheduled for uplink transmission in subframe i,
if any one of the above conditions 1, 2, 3, 4, 5 and 6 is met, $\delta_c=0$;
if accumulation is not enabled, calculating, by the UE, the transmit power control adjustment state variable $f_c(i)$ for the transmission of the UE in subframe i for the serving cell c according to $f_c(i)=\delta_c(i-K)$, wherein $\delta_c(i-K)$ denotes the TPC command received by the UE in subframe i-K, for the above conditions 1 to 6,
if any one of the above conditions 1, 2, 3, 4, 5 and 6 is met, $f_c(i)=f_c(i-1)$;
the uplink power control information reported by the UE is a power headroom report (PHR), and the UE reports the PHR according to the calculated $f_c(i)$.

7. An uplink transmission method, comprising:
determining, by a user equipment (UE), a carrier clear assessment (CCA) threshold according to a UE maximum transmit power;
measuring, by the UE, an energy level of other signals on a same carrier of an unlicensed band; and
determining, by the UE, an uplink transmission mode of the UE on the carrier according to whether the measured energy level is higher than the CCA threshold.

8. The method of claim 7, wherein
the determining, by the UE, the uplink transmission mode of the UE on the carrier according to whether the detected energy is higher than the CCA threshold comprises:
if the measured energy level is higher than the CCA threshold, the UE not transmitting or deferring transmitting uplink signals; or adjusting the uplink transmit power and transmitting the uplink signals with the adjusted uplink transmit power; otherwise, transmitting, by the UE, uplink signals following scheduling of a base station.

9. The method of claim 7, wherein
the UE maximum transmit power is determined by UE maximum transmit power configuration information received from the base station, wherein the UE maximum transmit power configuration information comprises one or more of the following:
a total configured maximum output power,
a configured maximum transmit power on a carrier,
a configured serving cell group maximum transmit power,
a UE transmit power scheduled by the base station,
a configured maximum transmit power offset,
a configured maximum transmit power for determining the CCA threshold,
the UE maximum transmit power is determined according to a power class of the UE.

10. A method for transmitting uplink control information, comprising:
generating, by a base station, control information used for control carrier clear assessment (CCA) of uplink transmission, the control information including a CCA threshold for uplink transmission; and
transmitting to a user equipment (UE), by the base station, the control information,
wherein the control information is used for determining a UE maximum transmit power used for determining a CCA threshold for uplink transmission.

11. A power control method, comprising:
receiving, by a user equipment (UE), power control indication information from a base station, and obtaining a transmit power control (TPC) command; and
performing, by the UE, power control adjustment to an uplink transmission of the UE on an unlicensed band according to the TPC command;
wherein if accumulation is enabled, calculating, by the UE, a transmit power control adjustment state variable $f_c(i)$ for the transmission in subframe i for a serving cell c according to $f_c(i)=f_c(i-1)+\delta_c(i-K)$, wherein $\delta_c(i-K)$ denotes the TPC command received by the UE in subframe i-K, for following conditions 1 to 6,
1, the UE does not receive the corresponding TPC command in subframe $i-K_{PUSCH}$;
2, the UE is in a DRX state;
3, in the TDD system, subframe i is not an uplink subframe;
4, on the unlicensed carrier c, the UE does not transmit uplink signal in subframe i;
5, on the unlicensed carrier c, subframe i is not an uplink subframe;
6, on the unlicensed carrier c, the UE is not scheduled for uplink transmission in subframe i,
if any one of the above conditions 1, 2, 3, 4, 5 and 6 is met, $\delta_c=0$;
if accumulation is not enabled, calculating, by the UE, the transmit power control adjustment state variable $f_c(i)$ for the transmission of the UE in subframe i for the serving cell c according to $f_c(i)=\delta_c(i-K)$, wherein $\delta_c(i-K)$ denotes the TPC command received by the UE in subframe i-K, for the above conditions 1 to 6,
if any one of the above conditions 1, 2, 3, 4, 5 and 6 is met, $f_c(i)=f_c(i-1)$.

12. A user equipment (UE), comprising:
a transceiver; and
a controller coupled with the transceiver, and configured to:
receive from a base station, power control indication information,
identify a power control mode indicating that a mechanism for power control is selected by the base station or the UE,
if the power control mode indicates that the mechanism for power control is selected by the base station, perform power control for an uplink transmission of the UE on an unlicensed band according to a first power control mechanism or a second power control mechanism selected by the base station; and
if the power control mode indicates that the mechanism for power control is selected by the UE, performing, by the UE, power control for the uplink transmission of the UE on the unlicensed band according to the first power control mechanism or a third power control mechanism selected by the UE.

13. A user equipment (UE), comprising:
a transceiver; and
a controller coupled with the transceiver, and configured to:
configure uplink power control information
used for scheduling an uplink transmission of the UE on an unlicensed band,
transmit to a base station, the uplink power control information, and
wherein the uplink power control information including at least one of:

a UE-expected transmit power being an expected uplink transmit power determined by the UE, according to an energy level of other wireless signals detected by the UE, for reducing an interference caused by the other devices,
power offset information indicating an energy level of the other wireless signals on the same carrier measured by the UE, or
information indicating whether the UE decreases an uplink transmit power.

14. A user equipment (UE), comprising:
a transceiver; and
a controller coupled with the transceiver, and configured to:
determine a carrier clear assessment (CCA) threshold according to a UE maximum transmit power;
measure energy level of other signals on a same carrier of an unlicensed band; and
determine an uplink transmission mode of the UE on the carrier according to whether the measured energy level is higher than the CCA threshold.

15. A base station, comprising:
a transceiver; and
a controller coupled to the transceiver, wherein the controller is configured to:
generate control information used for control carrier clear assessment (CCA) of uplink transmission, the control information including a CCA threshold for uplink transmission; and
transmit to a user equipment (UE), the control information,
wherein the control information is used for determining a UE maximum transmit power used for determining a CCA threshold for uplink transmission.

16. A user equipment (UE), comprising:
a transceiver; and
a controller coupled to the transceiver, wherein the controller is configured to:
receive power control indication information from a base station, and obtaining a transmit power control (TPC) command; and
perform power control adjustment to an uplink transmission of the UE on an unlicensed band according to the TPC command;
wherein if accumulation is enabled, calculating, by the UE, a transmit power control adjustment state variable $f_c(i)$ for the transmission in subframe i for a serving cell c according to $f_c(i)=f_c(i-1)+\delta_c(i-K)$, wherein $\delta_c(i-K)$ denotes the TPC command received by the UE in subframe i-K, for following conditions 1 to 6,
1, the UE does not receive the corresponding TPC command in subframe $i-K_{PUSCH}$;
2, the UE is in a DRX state;
3, in the TDD system, subframe i is not an uplink subframe;
4, on the unlicensed carrier c, the UE does not transmit uplink signal in subframe i;
5, on the unlicensed carrier c, subframe i is not an uplink subframe;
6, on the unlicensed carrier c, the UE is not scheduled for uplink transmission in subframe i,
if any one of the above conditions 1, 2, 3, 4, 5 and 6 is met, $\delta_c=0$;
if accumulation is not enabled, calculating, by the UE, the transmit power control adjustment state variable $f_c(i)$ for the transmission of the UE in subframe i for the serving cell c according to $f_c(i)=\delta_c(i-K)$, wherein $\delta_c(i-$ K) denotes the TPC command received by the UE in subframe i−K, for the above conditions 1 to 6,
if any one of the above conditions 1, 2, 3, 4, 5 and 6 is met,
$f_c(i)=f_c(i-1)$.

\* \* \* \* \*